United States Patent
Kido et al.

(12)

(10) Patent No.: US 8,522,006 B2
(45) Date of Patent: Aug. 27, 2013

(54) ENHANCED DISTRIBUTION OF DIGITAL CONTENT

(75) Inventors: Ryan Kido, Westlake Village, CA (US); David Wolf, Encino, CA (US); Youssef Tuma, New York, NY (US)

(73) Assignee: Accenture Global Services Limited, Dublin (IE)

( * ) Notice: Subject to any disclaimer, the term of this patent is extended or adjusted under 35 U.S.C. 154(b) by 1030 days.

(21) Appl. No.: 12/551,619

(22) Filed: Sep. 1, 2009

(65) Prior Publication Data

US 2010/0070753 A1 Mar. 18, 2010

Related U.S. Application Data

(60) Provisional application No. 61/094,623, filed on Sep. 5, 2008.

(51) Int. Cl.
*G06F 17/30* (2006.01)
*G06F 15/16* (2006.01)
*G06F 3/048* (2006.01)
*H04L 29/06* (2006.01)

(52) U.S. Cl.
USPC .......................................... 713/150; 715/748

(58) Field of Classification Search
USPC ........................................ 713/150; 715/748
See application file for complete search history.

(56) References Cited

U.S. PATENT DOCUMENTS

| 6,385,596 | B1 * | 5/2002 | Wiser et al. ..................... 705/51 |
| 2006/0080257 | A1 * | 4/2006 | Vaughan et al. ................ 705/51 |
| 2006/0236221 | A1 * | 10/2006 | McCausland et al. ..... 715/500.1 |

FOREIGN PATENT DOCUMENTS

| CN | 101196970 A | 6/2008 |
| WO | WO2006073543 A2 | 7/2006 |

OTHER PUBLICATIONS

Chinese Patent Office, Office Action in Corresponding Chinese Application No. 200910246801.5 mailed Jul. 3, 2012, 22 pages.
European Search Report for Application No. 09252137.6 dated Dec. 4, 2009, 5 pages.
"Accenture Profiles High Performance in Entertainment," Copyright 2007 Accenture, 16 pages (*retrieved from* <http://www.accenture.com/NR/rdonlyres/860467BD-10FB-4588-A9DD-D21AFCAFFB56/0/ProfilesEntertainment.pdf>).

* cited by examiner

*Primary Examiner* — Kambiz Zand
*Assistant Examiner* — Aubrey Wyszynski
(74) *Attorney, Agent, or Firm* — Fish & Richardson P.C.

(57) ABSTRACT

The enhanced distribution of digital content, in which a digital content distribution process is dynamically modeled, the digital content distribution process is invoked, and a serviced digital copy is provided to a recipient. Invoking the digital content distribution process further includes ingesting digital content, further including storing a digital master of the digital content in a digital vault, and servicing the digital copy of the stored digital master based on a servicing request received from the recipient.

31 Claims, 20 Drawing Sheets

ENHANCED DISTRIBUTION OF DIGITAL CONTENT

CROSS-REFERENCE TO RELATED APPLICATION

This application claims the benefit of U.S. Provisional Patent Application No. 61/094,623, filed Sep. 5, 2008, the disclosure of which is incorporated by reference.

TECHNICAL FIELD

The present disclosure generally relates to digital content management.

BACKGROUND

The creation and distribution of digital content, including but not limited to acoustic, visual, and/or interactive media (e.g., video, audio, rich media file formats, etc.), involves many digital content processing activities, including both manual and automated tasks. Digital content processing activities, for example, may include work order management for transformation from physical to digital media, the fulfillment of content processing operations, and the delivery of media to external locations. During the creation and/or distribution of an individual digital content deliverable, one or more processing activities may be executed remotely and/or by third party vendors. Examples of entities involved in the preparation of digital content include film studios, cable providers, and interactive video game developers.

The preparation of digital content may be managed within the originating entity by manually tracking the individual processing activities. Service-Oriented Architecture (SOA) based technologies, such as Business Process Management (BPM), queue management, and/or Enterprise Service Bus (ESB), may additionally be used to track one or more of the processing activities (e.g., in the form of business process state management and messaging). The SOA based technologies, for example, may provide a manner to track some standard automated digital content processing activities.

SUMMARY

According to one general implementation, a computer-implemented process includes dynamically modeling a digital content distribution process, invoking the digital content distribution process, and providing a serviced digital copy to a recipient. Invoking the digital content distribution process further includes ingesting digital content, further including storing a digital master of the digital content in a digital vault, and servicing the digital copy of the stored digital master based on a servicing request received from the recipient.

Implementations may include one or more of the following features. For instance, ingesting the digital content may further include monitoring a message queue for a message generated by a user interface to begin ingesting the content, instantiating an ingestion instance, parsing the message into a response object, the response object comprising a correlation identifier identifying the instantiated ingestion instance, and providing the response object to the user interface. The message may identify an import operation or an upload operation. The process may also include appending a current timestamp with a transaction identifier associated with an ingestion request to ingest the content, and generating the correlation identifier based on the appended current timestamp and transaction identifier. Invoking the digital content distribution process may further include receiving a task object, exposing key variables to a user interface based on the received task object, and storing the key variables in a database.

In further examples, invoking the digital content distribution process may further include iteratively storing, to a database, instance information upon finishing invoking each sub-activity of the dynamically modeled digital content distribution process, detecting an exception while executing a sub-activity, and re-executing the sub-activity using the iteratively stored instance information. Invoking the digital content distribution process may further include querying a database for metadata associated with the digital master, and exposing key variables to a user interface based on the metadata.

In other examples, invoking the digital content distribution process may further include uploading an XML file encoded with the metadata using the user interface, and mapping the file to an ingestion instance or a servicing instance. Invoking the digital content distribution process may further include exposing key variables to the user interface, further including exposing a determined first current system time as a start time key variable, and an end time set to null as an end time key variable, exposing a "waiting for upload" status as a workflow status key variable based on determining that an ingestion task is pending, exposing an "uploading: status as the workflow status key variable based on determining that an uploading task is pending, exposing an "ingesting" status as the workflow status key variable based on determining that an ingestion task is occurring, exposing an "in" status as the workflow status key variable and a determined second current system time as the end time key variable, based on determining that an ingestion task is completed, exposing a "cancelled" status as the workflow status key variable based on determining that an ingestion instance is in a cancelled state, exposing an "error" status as the workflow status key variable based on determining that the ingestion instance is in an error state, exposing a "waiting for master" status as the workflow status key variable based on determining that the digital master is being ingested, exposing a "source ready" status as the workflow status key variable based on determining that the digital copy is ready for servicing, and exposing an "in progress" status as the workflow status key variable based on determining that digital copy is being exported from the digital vault.

In additional examples ingesting the digital content may further include receiving an interrupt message identifying an interactive activity, interrupting the ingesting of the digital content based on the received interrupt message, and invoking the interactive activity based on interrupting the ingesting. The process may also include resuming ingesting of the digital content based on completing the invocation of the interactive activity. Ingesting the digital content may further include extracting information from a task object, and from metadata associated with the digital master, and populating a file transfer request using the information. Extracting the information may further include extracting a file name from the metadata, and extracting a source delivery profile and a destination delivery profile from the task object. Populating the file transfer request may further include assigning the file name, the source delivery profile, and the destination delivery profile to a request object. Ingesting the digital content may further include transferring the digital master from a node associated with the source delivery profile to an inbound storage destination associated with the destination delivery profile.

In further examples, storing the digital master in the digital vault may further include transferring the digital master from the inbound storage destination to the digital vault, or deleting a digital master stored in the digital vault. Ingesting the digital content may further include determining, from metadata associated with the digital master, a location within the digital vault to store the digital master. Ingesting the digital content may further include determining that an ingestion task is occurring, exposing key variables to the user interface based on determining that the ingestion task is pending, further including exposing an ingesting status as a workflow status key variable, setting a flag to signify that the ingestion task is occurring, and rejecting an interruption request received while the flag is set. The servicing request may be received prior to completion of the ingesting, and ingesting the digital content may further include notifying a service process identified in the servicing request based on determining that the ingesting of the digital content is complete.

Furthermore, ingesting the digital content may include encoding a physical master of the content into the digital master. The process may also include receiving a request to service the digital master from a recipient. The process may also include dynamically modeling an exception handling process disconnected from the digital content distribution process, detecting an exception during the invoking of the digital content, and propagating the exception to the dynamically handled exception handing process.

Moreover, propagating the exception may further include determining whether an ingestion instance may be cancelled based upon a status of the digital content distribution process. Propagating the exception may further include executing a compensation activity defined by the digital content distribution process based on detecting the exception. Executing the compensation activity may further include reverting metadata to an original value based on determining that metadata has been updated, reverting a workflow status key variable to a previous state based on determining that the workflow status key variable has been updated, deleting the digital master from an inbound storage destination based on determining that the digital master has been transferred to the inbound storage destination, and deleting the digital master from the digital vault based on determining that the digital master has been transferred from the inbound storage destination to the digital vault. Invoking the digital content distribution process may further include creating the digital copy of the stored digital master, and exporting the digital copy from the digital vault to an operational storage.

In additional examples, servicing the digital copy may further include monitoring a message queue for a message generated by a user interface to begin servicing the content, and instantiating a servicing instance. Servicing the digital copy may further include watermarking the digital copy based on the servicing request, and encrypting the digital copy based on the servicing request. Invoking the digital content distribution process may further include determining a workflow name, an output format, a content formatting template, and a transcode profile based on the servicing request, and determining whether the output format, the content formatting template, and the transcode profile are active. The digital copy of the stored digital master may be serviced only if the output format, the content formatting template, and the transcode profile are determined to be active.

According to another general implementation, a computer readable medium is encoded with a computer program comprising instructions that, when executed, operate to cause a computer to perform operations including dynamically modeling a digital content distribution process, invoking the digital content distribution process, and providing a serviced digital copy to a recipient. Invoking the digital content distribution process further includes ingesting digital content, further comprising storing a digital master of the digital content in a digital vault, and servicing the digital copy of the stored digital master based on a servicing request received from the recipient.

According to a further general implementation, a system includes one or more computers, and a computer-readable medium coupled to the one or more computers having instructions stored thereon which, when executed by the one or more computers, causes the one or more computers to perform operations including dynamically modeling a digital content distribution process, invoking the digital content distribution process, and providing a serviced digital copy to a recipient. Invoking the digital content distribution process further includes ingesting digital content, further comprising storing a digital master of the digital content in a digital vault, and servicing the digital copy of the stored digital master based on a servicing request received from the recipient.

The details of one or more implementations are set forth in the accompanying drawings and the description below. Other potential features and advantages will be apparent from the description and drawings, and from the claims.

BRIEF DESCRIPTION OF DRAWINGS

Referring now to the drawings, in which like reference numbers represent corresponding parts throughout.

DETAILED DESCRIPTION

Figure 1:
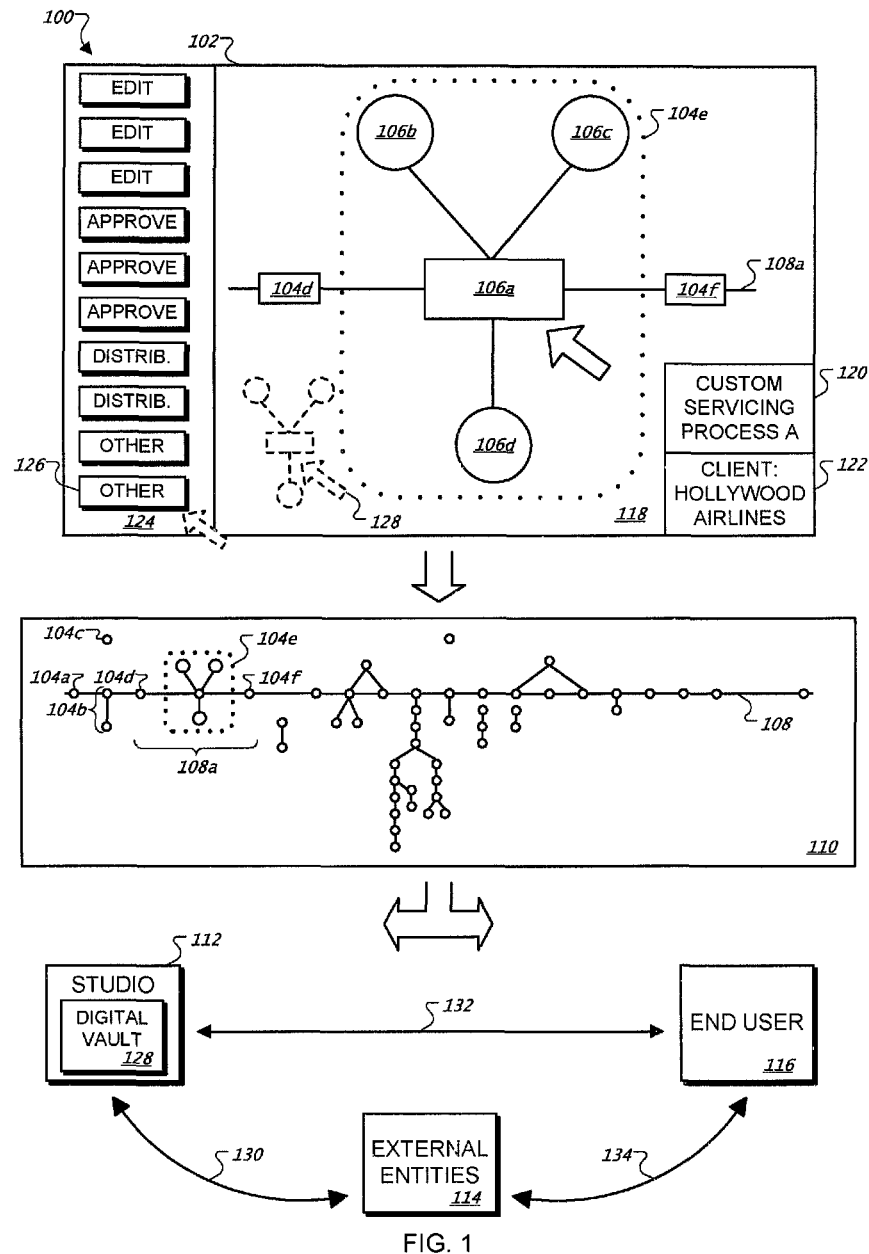
FIG. 1 is a conceptual diagram of a system for dynamically modeling and executing a digital content distribution process.

FIG. 1 is a conceptual diagram of a system 100 for dynamically modeling and executing a digital content distribution process. The system 100 may be used to establish a customized process for creating and/or distributing digital media such as a movie or video game. A process editing graphical user interface (GUI) 102 provides a user with the ability to add, remove, and/or modify individual activities 104 and/or sub-activities 106 within a distribution process 108. The distribution process 108 may then be saved.

A graphical distribution pipeline model 110 represents the customized distribution process 108. When the distribution process 108 is invoked (i.e., loaded, called, run, or executed), the represented activities 104 and/or sub-activities 106 are executed in the manner determined by the distribution process 108. The activities 104 and/or sub-activities 106, for example, may be executed by an originating studio 112, external entities 114 (e.g., graphical editing vendors, soundtrack modification vendors, professional ratings and/or review boards, etc.) and/or an end user 116.

As shown in the process editing GUI 102, an editing pane 118 contains a portion of a "Custom Servicing Process A" 120 (e.g., the distribution process 108). The "Custom Servicing Process A" 120 is being modified on behalf of a "Hollywood Airlines" client 122. A model of a portion 108a of the distribution process 108, including activities 104 and sub-activities 106, is visible within the editing pane 118. Each activity 104 and/or sub-activity 106 represents a discrete task which may be executed during the distribution process 108. Broad categories of activities 104 and/or sub-activities 106 may include notifications, requests, information transfers, verifications, and/or digital media manipulations. More explicit examples of activity categories are described below.

A template menu 124 contains selectable templates for editing activities and/or sub-activities within the editing pane 118. The template menu 124 includes editing options such as, but not limited to, options for adding, modifying, or reordering activities, sub-activities, or groups of activities and/or sub-activities. A template may include, for example, a grouping of activities for executing a common distribution task such as gaining approval for modifications made to licensed digital content.

An "Other" template option 126 is selected by a user. By dragging 128 the "Other" template option 126 into the editing pane 118, the user may drop the activity grouping 104e into the distribution process 108. The activity grouping 104e includes the sub-activity 106a connected to three satellite sub-activities 106b, 106c, 106d. The activity grouping 104e, for example, may implement a distribution process task requiring input from three separate entities (e.g., internal departments, external entities, etc.).

After introducing the activity grouping 104e to the distribution process 108, the user may save the changes to the distribution process 108. The activity grouping 104e is now visible within the graphical distribution pipeline model 110. The graphical distribution pipeline model 110 may represent a complete distribution process flow 108. Although only activities and sub-activities are represented within the graphical distribution pipeline model 110, other flow controllers, such as decision branches, timers, or recursions, may also be built into the distribution process 108.

Not all of the activities 104 and/or sub-activities 106 are directly attached to the pipeline of the distribution process 108. The activity 104c is situated above the pipeline of the distribution process 108. Disconnected activities may relate to message handling, exception handling, or interruption handling processes. For example, if an exception is detected during the ingestion of new digital content (e.g., activities 104a, 104b), the exception activity (e.g., 104c) may be invoked to cancel, restart, or repair the problem.

Upon invoking the distribution process 108, the activities 104 and sub-activities 106 are executed by the studio 112, the external entities 114, and/or the end user 116. The studio 112 (e.g., a motion picture film studio, video game designer, etc.) includes a digital vault 128. The digital vault 128 (e.g., one or more mass storage devices such as hard disk drives, etc.) stores the digital media which is being acted upon by the distribution process 108. For example, the digital vault 128 may contain a movie. To distribute the movie to the end user 116, the movie may first be read from the digital vault.

The movie and/or other information may be shared with the external entities 114, as illustrated by a double-sided arrow 130. The movie and/or other information may also be shared with the end user 116, as illustrated by a double-sided arrow 132. In addition, the end user 116 may share the movie and/or other information with the external entities 114, as illustrated by a double-sided arrow 134. The arrows 130, 132, and 134 may be followed any number of times and in any order during the distribution process, as dictated by the activities and/or sub-activities established within the distribution process 108.

Figure 2:
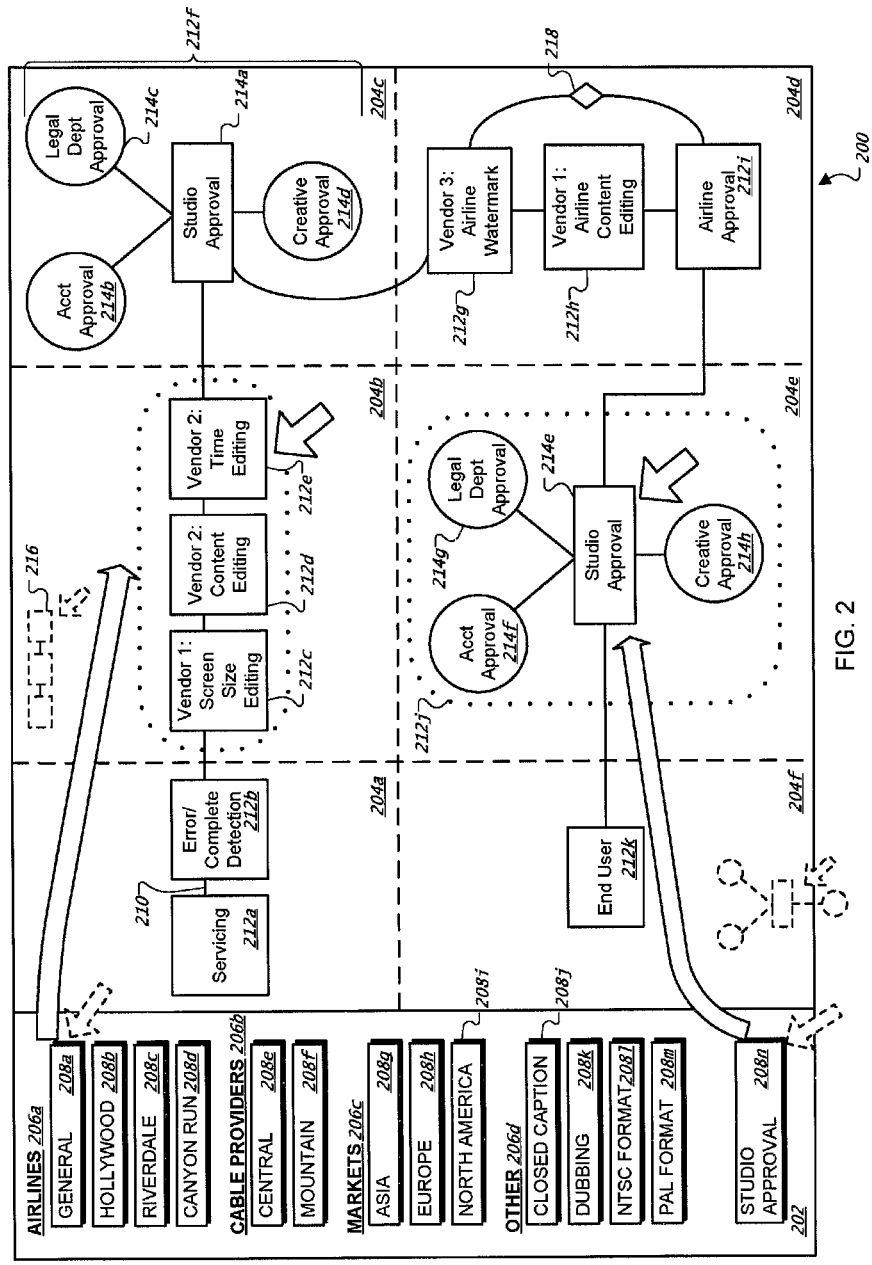
FIG. 2 is a conceptual diagram of a user interface for building a dynamic model of a digital content distribution process based upon stored templates.

FIG. 2 is a conceptual diagram of a user interface 200 for building a dynamic model of a digital content distribution process based upon stored templates. The user interface 200, for example, may be used to generate the distribution process 108 as illustrated in FIG. 1. Using the user interface 200, a user may take advantage of stored templates to accelerate the process of designing a customized digital content distribution process. Certain activities and/or groups of activities may be common amongst most clients or amongst groups of similar clients. By storing standard activity configurations within templates, a user may benefit from prior distribution process designs when configuring a new distribution process or updating a stored distribution process.

The user interface 200 includes a templates menu 202 and an editing pane 204. The templates menu 202 contains four topic headers 206: "Airlines" header 206a, "Cable Providers" header 206b, "Markets" header 206c, and "Other" header 206d. The topic headers 206 may be used to group templates by types of clients (e.g., "Airlines" 206a and "Cable Providers" 206b), locations of clients (e.g., "Markets" 206c), and standard distribution tasks (e.g., "Other" 206d). Other topic headers are possible.

Each topic header 206 contains one or more stored templates 208. The "Airlines" header 206a contains a "General" template 208a relating to one or more templates generic to any airline distribution processes. The remaining templates 208 beneath the "Airlines" header 206a relate to specific airline clients (e.g., a "Hollywood" template 208b, a "Riverdale" template 208c, and a "Canyon Run" template 208d). The "Cable Providers" header 206b contains templates specific to two cable provider clients: a "Central" template 208e and a "Mountain" template 208f. The "Markets" header 206c contains templates specific to the "Asian" market 208g, the "European" market 208h, and the "North American" market 208i (e.g., film industry markets, etc.). The "Other" header 206d contains templates for film formatting standards such as a closed captioning template 208j, a dubbing template 208k, a National Television System Committee (NTSC) formatting template 208l, and a Phase Alternating Line (PAL) formatting template 208m. A studio approval template 208n appears at the bottom of the templates menu 202.

An editing session is visible within the editing pane 204. A distribution process 210, laid out within the editing pane 204 in a clockwise fashion, is being modified. The editing pane 204 is sectioned into six cells, 204a through 204f. Each cell within the editing pane 204, for example, may represent an individual template category. Each cell within the editing pane 204 contains one or more activities 212 and/or sub-activities 214. The first cell 204a contains a servicing activity 212a and an error/complete detection activity 212b.

The general template 208a has been selected and dragged into the second cell 204b by the user The general template 208a, as illustrated in preview image 216, contains three activities: a "Vendor 1: Screen Size Editing" activity 212c, a "Vendor 2: Content Editing" activity 212d, and a "Vendor 2: Time Editing" activity 212e. The vendor labeling within the activities 212c, 212d, 212e may pertain to two separate external entities (e.g., such as the external entities 114 as described in FIG. 1) which will execute the individual activities 212c, 212d, or 212e. The three activities 212c, 212d, 212e within the general template 208a may relate to activities generic to most airline distribution processes.

The third cell 204c contains an activity 212f involving four sub-activities: a "Studio Approval" sub-activity 214a, an "Account Approval" sub-activity 214b, a "Legal Department Approval" sub-activity 214c, and a "Creative Approval" sub-activity 214d. The approvals may relate to the modifications made by the activities 212c, 212d, and 212e within the second pane 204b.

The distribution process 210 next enters the fourth cell 204d where a "Vendor 3: Airline Watermark" activity 212g leads to either a "Vendor 1: Airline Content Editing" activity 212h or an "Airline Approval" activity 212i depending upon a decision marker 218. The activities 212g, 212h, and 212i may pertain to activities specific to a particular airline client. The activities 212g, 212h, and 212i, for example, may correlate to the "Hollywood" template 208b, the "Riverdale" template 208c, or the "Canyon Run" template 208d.

The fifth cell 204e contains the same activity structure as found within the third cell 204c. The studio approval activity 212j has been dragged into the fifth cell 204e from the studio approval template 208n. The studio approval activity 212j may relate to approving the modifications made by the activities 212g, 212h and 212i within the fourth cell 204d. The distribution process 210 is completed in the sixth cell 204f with an end user activity 212k. The end user activity 212k may relate to the delivery of the digital content to the airline client.

Figure 3:
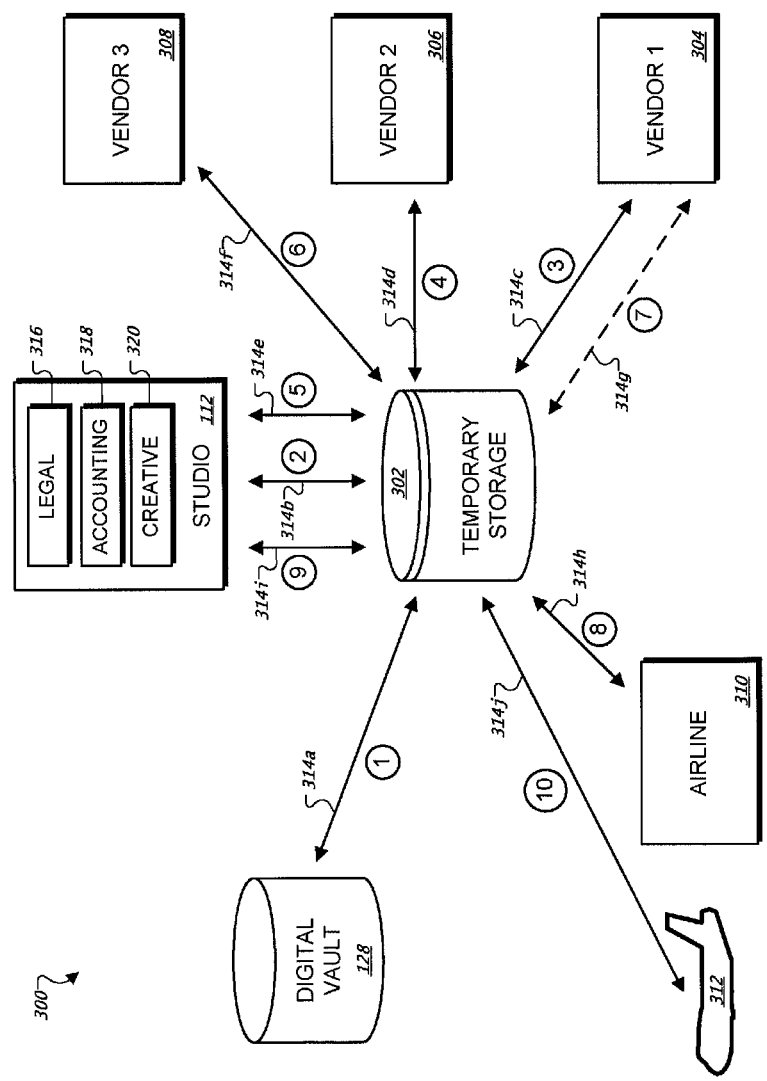
FIG. 3 is a process flow diagram illustrating the external interfacing of the system of FIG. 2.

FIG. 3 is a process flow diagram 300 illustrating the external interfacing of the system 200 of FIG. 2. The process flow diagram 300 includes a temporary storage device 302 which is in communication with the studio 112 (as described in FIG. 1), the digital vault 128, a first vendor 304, a second vendor 306, a third vendor 308, an airline 310, and an airplane 312. A set of double-ended arrows illustrate the communication steps 314 between the temporary storage device 302 and the internal and/or external entities 112, 128, 304, 306, 308, 310, and 312. The double-ended arrows 314 may represent secure wired and/or wireless communication links through a communication medium such as an intranet, extranet, local area network (LAN), or wide area network (WAN), etc.

Before the distribution process 210 is executed, a request may be received from the recipient (e.g., the airline 310) including information regarding the desired digital content. The request may include information regarding the desired digital content such as a file name and destination information. The distribution process 210 is initiated to fulfill the request from the recipient.

The distribution process 210 begins by transferring digital content from a secure long-term storage to a temporary storage location for processing. The temporary storage device 302 (e.g., one or more mass storage devices such as hard disk drives, etc.) receives digital content from the digital vault 128 during the first communication step 314a. The servicing activity 212a (as shown in FIG. 2) works to transfer a copy of the digital content into the temporary storage device 302. Herein, the term "digital content" may refer to all or a portion of the digital content transferred from the digital vault 128. The sharing of digital content between the temporary storage device 302 and one or more of the entities 112, 304, 306, 308, 310, and 312 may include internal and/or remote access of the contents of the temporary storage device 302 and/or digital media transfer between the temporary storage device 302 and one or more of the entities 112, 128, 304, 306, 308, 310, and 312.

The digital content is shared with the studio 112 during the second communication step 314b, allowing the error/complete detection activity 212b to validate the content transfer. The first vendor 304 receives the digital content from the temporary storage 302 during the third communication step 314c. The first vendor 304 applies the screen size editing activity 212c to the digital content. Upon completion, the first vendor 304 returns the modified digital content to the temporary storage device 302.

The second vendor 306 receives the digital content from the temporary storage 302 during the fourth communication step 314d. The second vendor 306 executes both the content editing activity 212d and the time editing activity 212e upon the digital content. Upon completion, the second vendor 306 returns the modified digital content to the temporary storage device 302.

The studio receives the digital content from the temporary storage device 302 during the fifth communication step 315e. Not necessarily in this order of operations, a legal department 316 applies the legal department approval sub-activity 214c, an accounting department 318 applies the accounting approval sub-activity 214b, and a creative department 320 applies the creative approval sub-activity 214d. The studio 112 applies the studio approval sub-activity 214a and returns the digital content to the temporary storage device 302.

The temporary storage device 302 shares the digital content with the third vendor 308 during the sixth communication step 314f. The third vendor 308 executes the airline watermark activity 212g and returns the digital content to the temporary storage device 302. The first vendor 304 optionally receives the digital content from the temporary storage device 302 during the seventh communication step 314g, depending upon the outcome of the decision marker 218. The first vendor 304 applies the airline content editing activity 212h to the digital content and returns the digital content to the temporary storage device 302.

In the eighth communication step 314h, the airline 310 receives the digital content from the temporary storage device 302. The airline 310 executes the airline approval activity 212i and returns the digital content to the temporary storage device 302. The studio receives the digital content from the temporary storage device 302 during the ninth communication step 314i. Not necessarily in this order of operations, the legal department 316 applies the legal department approval sub-activity 214g, the accounting department 318 applies the accounting approval sub-activity 214f, and the creative department 320 applies the creative approval sub-activity 214h.

The studio 112 applies the studio approval sub-activity 214e and returns the digital content to the temporary storage device 302. The temporary storage device 302, in the tenth communication step 314j, transfers the digital content to the airplane 312 where the digital content may be presented for public viewing.

Figure 4:
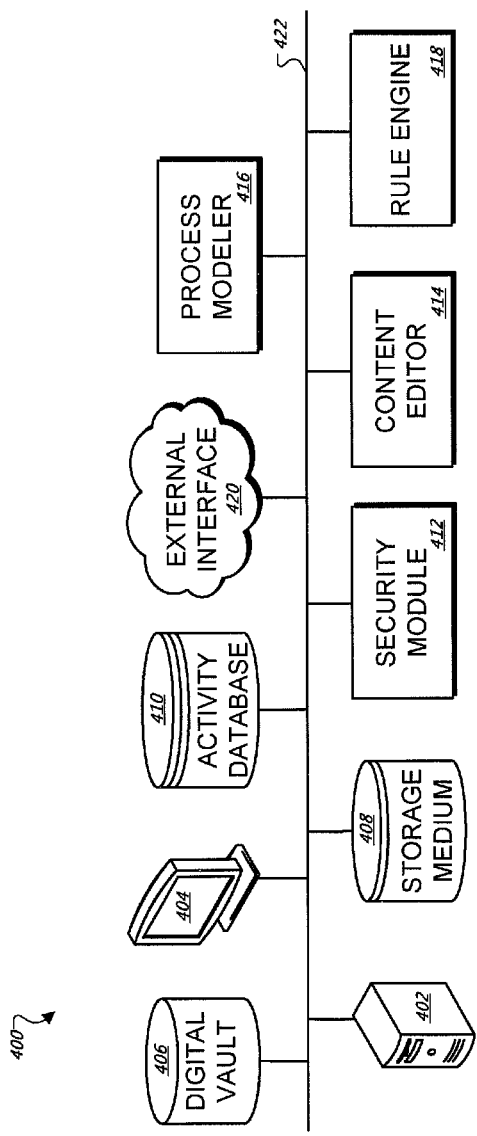
FIG. 4 is an exemplary architecture diagram for dynamically modeling and executing a digital content distribution process.

FIG. 4 is an exemplary architecture 400 for dynamically modeling and executing a digital content distribution process. The architecture 400 generally includes a processor 402, a user interface 404, one or more digital mass storage devices providing memory for a digital vault 406, a storage medium 408, and an activity database 410.

The architecture 400 also includes various hardware or software elements such as a security module 412, a content editor 414, a process modeler 416, and a rule engine 418. The individual elements of the architecture 400 are connected by a communication link 422 (e.g., internal system bus, intranet, wired and/or wireless LAN, etc.). The architecture 400 communicates through an external interface 420.

A user interacts with the process modeler application 416 via the user interface 404 (e.g., GUI) to graphically define a digital content distribution process as a series of activities and sub-activities. The user may include predefined activity templates, stored within the activity database 410, while generating the distribution process. The user may then save the customized distribution process to the storage medium 408.

When the distribution process stored within the storage medium 408 is executed, the rule engine 418 matches each activity and sub-activity included within the graphical digital content distribution process to one or more executable tasks. The digital content acted upon by the distribution process is stored within the digital vault 406. The digital vault 406 provides a secure long-term storage means for the digital content. When a distribution process is invoked, the digital content may be transferred from the digital vault 406 to one or more temporary storage locations such as the storage medium 408.

Internal modification activities may be executed upon the digital content. A security module 412 may apply cryptography and/or other security measures to the digital content in response to the execution of a security activity. A content editor 414 may apply editing and/or encoding means to the digital content in response to the execution of an editing or formatting activity.

External modification activities may also be executed upon the digital content. The external interface 420 may allow the digital content to be uploaded via a secure network connection to an external entity (not pictured). An external entity may also be provided with secure access to the digital content stored within the architecture 400. Additionally, notifications, requests, and other information may be shared with external entities through the external interface 420.

The modules, methods, processes and the like that are described may each be implemented as an individual process or application, part of an operating system, a plug-in, an application or the like. The dynamic modeling and execution of a digital content distribution process may also be implemented by a general- or special-purpose computer as one or more software applications running on the architecture 400. Such a system and method may be characterized as a framework or model that may be implemented on various platforms and/or networks (e.g., client/server networks, wireless networks, stand-alone computers, etc.), and/or embedded or bundled with one or more software applications.

Figure 5:
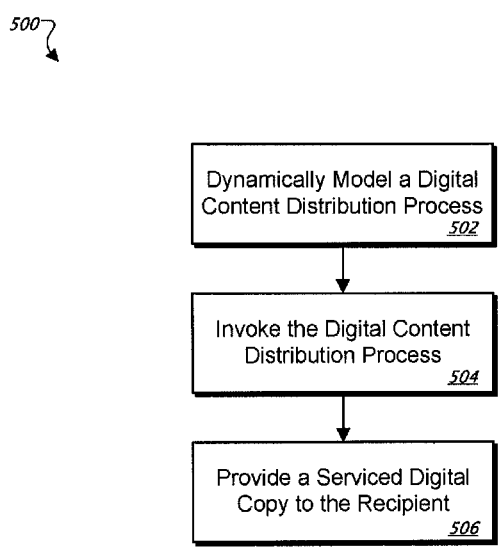
FIG. 5 is a flow chart illustrating a computer-implemented method in accordance with one general implementation.

FIG. 5 is a flow chart illustrating a computer-implemented method 500 in accordance with one general implementation. Briefly, a digital content distribution process is modeled using activity-based graphical modeling and pre-defined task templates. The digital content distribution process is then invoked, causing the execution of the series of modeled activities and sub-activities. The execution of the distribution process ends with the delivery of a serviced digital copy of the digital content to a recipient.

In more detail, when method 500 begins (step 502), a user is dynamically modeling a customized digital content distribution process. The content distribution process may be based upon a series of discrete activities and sub-activities. Each activity and/or sub-activity has a separate graphical representation. The customized digital content distribution process may include portions based on stored templates representing common distribution process tasks, each task comprised of one or more activities and/or sub-activities. Common distribution tasks may include common formatting standards, common security standards, client-specific security or formatting, regionally applicable content formatting, etc. In addition to pipelined content distribution activities, the user may dynamically model one or more asynchronous processes, such as message handling processes or exception handling processes disconnected from the distribution process pipeline.

In one example, the user may build a digital content distribution process using the user interface 200 as illustrated in FIG. 2. The user may add tasks to the distribution process using the template menu 202. The user may also include customized activities, sub-activities, and/or tasks. The content distribution process may involve any number of activities and/or sub-activities. A complete content distribution process model may be similar in appearance to the graphical distribution pipeline model 110 as illustrated in FIG. 1.

Once the content distribution process has been modeled and saved, the distribution process may be executed in order to create and distribute digital content to a recipient. A request for digital content may be received from a recipient. The request may include information regarding the digital content desired (e.g., file name(s), etc.) and/or information regarding the destination of the digital content. To fulfill the request, the digital content distribution process is invoked (step 504).

Execution of the digital content distribution process may include ingesting the digital content from an outside source. For example, a digital master of the original version of the desired digital content may be imported or uploaded to the digital content distribution system. A portion of the digital content distribution process may contain activities handling the monitoring and verification of the ingestion of the digital master. Ingestion of the digital master may include storing the digital master within a secure digital vault.

Execution of the digital content distribution process may include servicing a digital copy of the ingested digital master. For example, the servicing activity 212*a* as illustrated in FIG. 2 may transfer a digital copy of the digital master to temporary storage. The content distribution process may then execute modifications upon the digital copy. The servicing activity 212*a* may be invoked based upon a servicing request from the recipient.

Execution of the digital content distribution process may include editing the digital copy. As shown in FIG. 4, the content editor 414 of the architecture 400 may be used to modify the formatting, length, language, dubbing, subtitles, etc. of the digital copy. The security module 412 may be used to apply cryptography, watermarking, and other security features to the digital copy. External entities, such as the first vendor 304, the second vendor 306, and/or the third vendor 308 as illustrated in FIG. 3 may also be used to provide content and/or security modification to the digital copy.

The recipient and optionally the external entities may receive access to the digital copy via a secure external interface (e.g., the external interface 420 as shown in FIG. 4). The external interface, for example, may include secure wired and/or wireless access such as a virtual private network (VPN) connection or similar secure networking interface. During the execution of the content distribution process, the series of activities and/or sub-activities may transfer control of the digital copy between the recipient, the local user (e.g., the studio 112 as shown in FIG. 1), and any number of external entities.

During the execution of the content distribution process, an exception may occur. The digital content distribution process may store instance information upon completion of the execution of each activity and/or sub-activity. If an exception is detected, the content distribution process may execute a compensation activity based upon the detected exception. The compensation activity may include re-executing one or more activities and/or sub-activities, using the iteratively stored instance information. For example, if, upon completion of the an ingestion task of the content distribution process, the content distribution process detects that the digital copy is incomplete and/or corrupt, the exception handling process may delete the corrupt digital copy and re-invoke the ingestion task.

Upon completion of the content distribution process, a serviced digital copy of the digital master is provided to the recipient (step 506). The digital copy may be transferred to the recipient through a secure communication link such as the external interface 400 as described in FIG. 4. Additionally, the digital copy may be deleted from the temporary storage.

Figure 6:
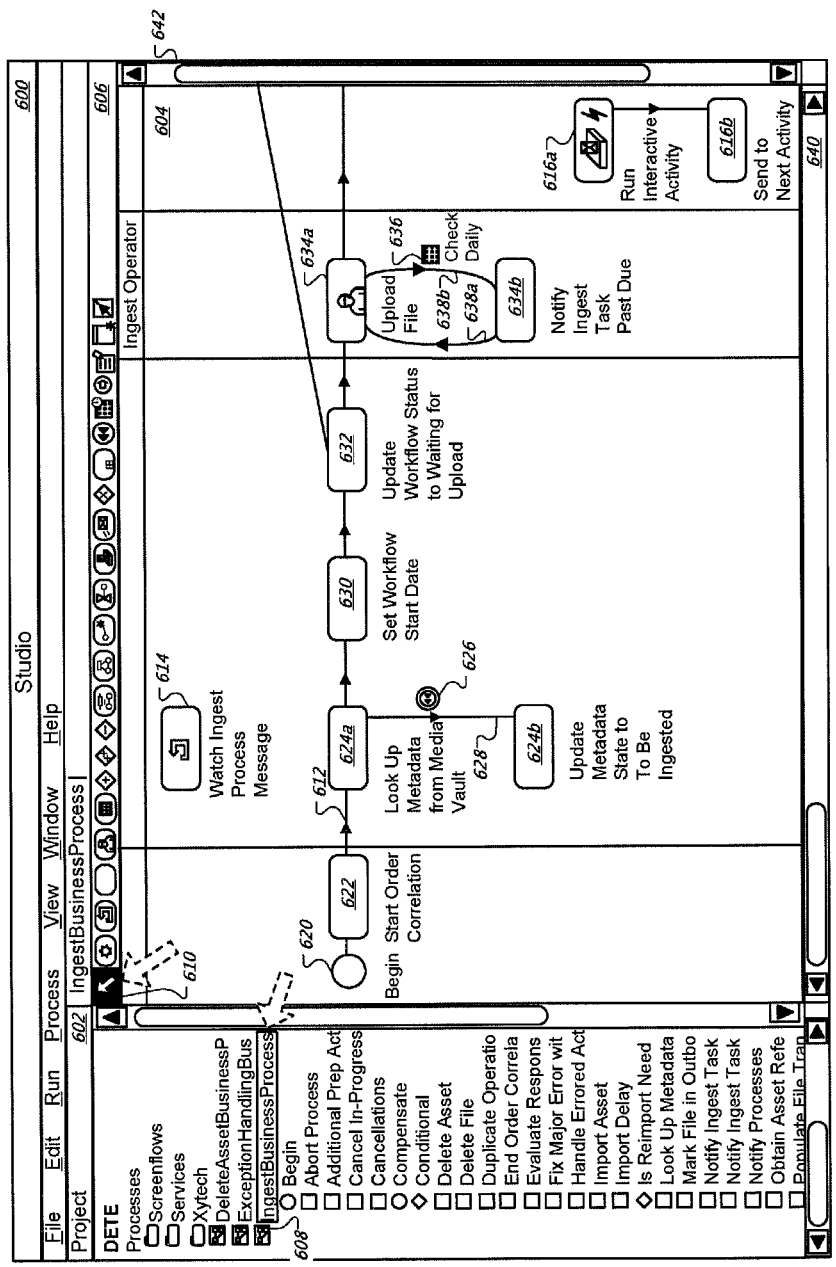
FIG. 6 illustrates an example user interface for dynamically modeling a digital content distribution process.

FIG. 6 illustrates an example user interface 600 for dynamically modeling a digital content distribution process. The user interface 600 includes a template menu 602, an editing pane 604, and a template icon bar 606. The user interface 600 may be used to create a customized activity-based digital content distribution process model based, in part, upon stored templates. The stored templates may contain one or more activities and/or sub-activities used to execute a common task.

The template menu 602 is organized by process folders. The process folders, for example, may pertain to common distribution process types such as content editing, security, exception handling, asset deletion, etc. An INGESTBUSINESSPROCESS folder 608 is selected. The INGESTBUSINESSPROCESS folder 608 may contain any number of templates associated with the ingestion of digital content from an outside source. The templates included within the template menu 602 include activity templates marked with a square icon, conditional templates marked with a diamond icon, and flow origination templates marked with a circular icon. Other template types may be possible.

In addition to using the template menu, the template icon bar 606 contains graphical representations of frequently used template types (e.g., activities, decision markers, timers, messages, etc.). A selection icon 610 is currently selected within the template icon bar 606. The selection icon 610, for example, may provide the user with drag and drop type control of the contents of the editing pane 604.

The editing pane 604 contains a graphical representation of a portion of an ingestion business process flow in a first state. The visible portion of the digital content distribution process includes an ingestion activity pipeline 612.

A queue monitoring activity 614, labeled "Watch Ingest Process Message", is arranged above and separate from the ingestion activity pipeline 612. The monitoring activity 614 may be run asynchronously from the activities within the ingestion activity pipeline 612 (e.g. as a background task). Monitoring activities such as the queue monitoring activity 614 may monitor messages, in some examples, from the user interface, from the parent process, and/or from associated processes. The messages may include notifications, interruptions, and/or cancellations. Other asynchronous activities, such as the asynchronous activity within the lower right portion of the editing pane 604 including a ran interactive activity sub-activity 616a and a send to next activity sub-activity 618b, may include an exception handling activity and/or a scheduling activity.

A begin activity 620 initiates the ingestion activity pipeline 612. A start order correlation activity 622 follows the begin activity 620. Next, a look up metadata from media vault sub-activity 624a coordinates with an update metadata state to 'to be ingested' sub-activity 624b.

A rewind symbol 626 is arranged alongside an arrow 628 connecting the look up metadata from media vault sub-activity 624a to the update metadata state to 'to be ingested' sub-activity 624b. The rewind symbol 626 represents a compensation activity. A compensation activity reverts the state of the active instance of the business process flow (e.g., updated variables, moved data files, etc.) to the state prior to invocation of the activity. A compensation activity, for example, may be invoked upon detection of an exception.

A set workflow start date activity 630 follows the look up metadata from media vault sub-activity 624a. An update workflow status to waiting for upload activity 632 follows the set workflow start date activity 630.

An upload file sub-activity 634a follows the update workflow status to waiting for upload activity 632. The upload file sub-activity 634a coordinates with a notify ingest task past due sub-activity 634b. A check daily calendar icon 636 is arranged beside a set of directional arrows 638 connecting the upload file sub-activity 634a to the notify ingest task past due sub-activity 634b. The directional arrows 638 demonstrate a circular connection between the two sub-activities 634.

The check daily calendar icon 636 represents a periodic monitoring activity. In this circumstance, for example, the periodic monitoring activity may monitor the progress of the uploading file. If the file has not completed uploading by a set period of time, the notify ingest task past due 634b may be invoked.

The ingestion activity pipeline 612 continues beyond the scope of the editing pane 604. A horizontal scroll bar 640 provides the user with access to the remaining activities to the left and right of the view within the editing pane 604. Other activities may be arranged above and below those pictured within the editing pane as well. A horizontal scroll bar 642 provides the user with access to the activities arranged above and below the view within the editing pane 604.

Figure 7:
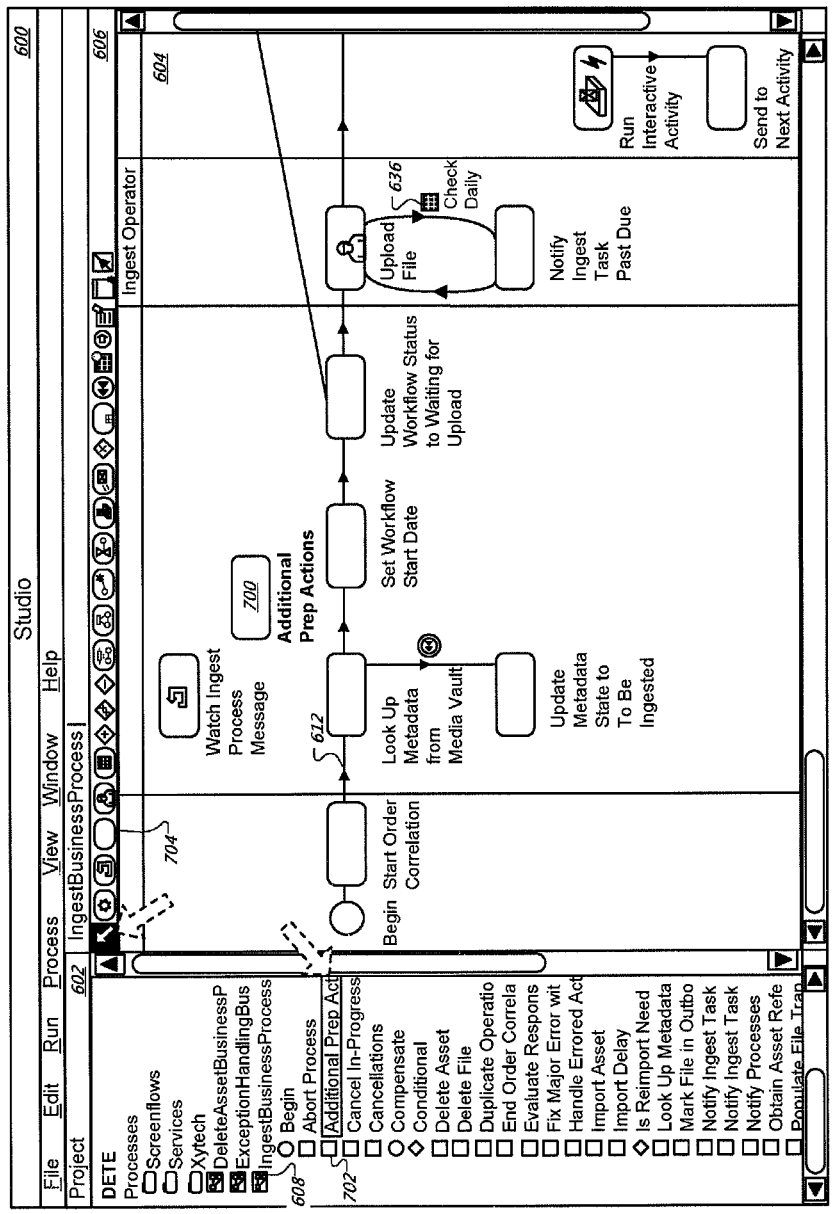
FIG. 7 depicts the user interface of FIG. 6, in a state after a user has added an activity to the user interface.

FIG. 7 depicts the user interface 600 of FIG. 6, in a state after a user has added an additional prep actions activity 700 to the user interface 600. The additional prep actions activity 700 is positioned above and disconnected from the ingestion activity pipeline 612 within the editing pane 604. An additional prep actions activity template 702 is selected from within the INGESTBUSINESSPROCESS folder 608 of the template menu 602. The user may have selected the additional prep actions activity template 702 from within the template menu 602, dragging and dropping the additional prep actions activity 700 into the editing pane 604.

After including a new element based upon a template, in some implementations, the user may opt to customize features of the element. For example, in the case of the check daily calendar icon 636, the user may choose to customize (e.g., via double-clicking the icon 636, right-clicking the icon 636, etc.) the timer length for the periodic timeout.

In some implementations, rather than adding a specific activity template from the template menu 602 or the template icon bar 606, the user may choose to include a fully customized activity. For example, a blank activity template 704 may be selected from the template icon bar 606. After modifying a template-based activity or creating a custom activity, the activity may additionally be saved as a new activity template type (e.g., added to the template menu 602).

Figure 8:
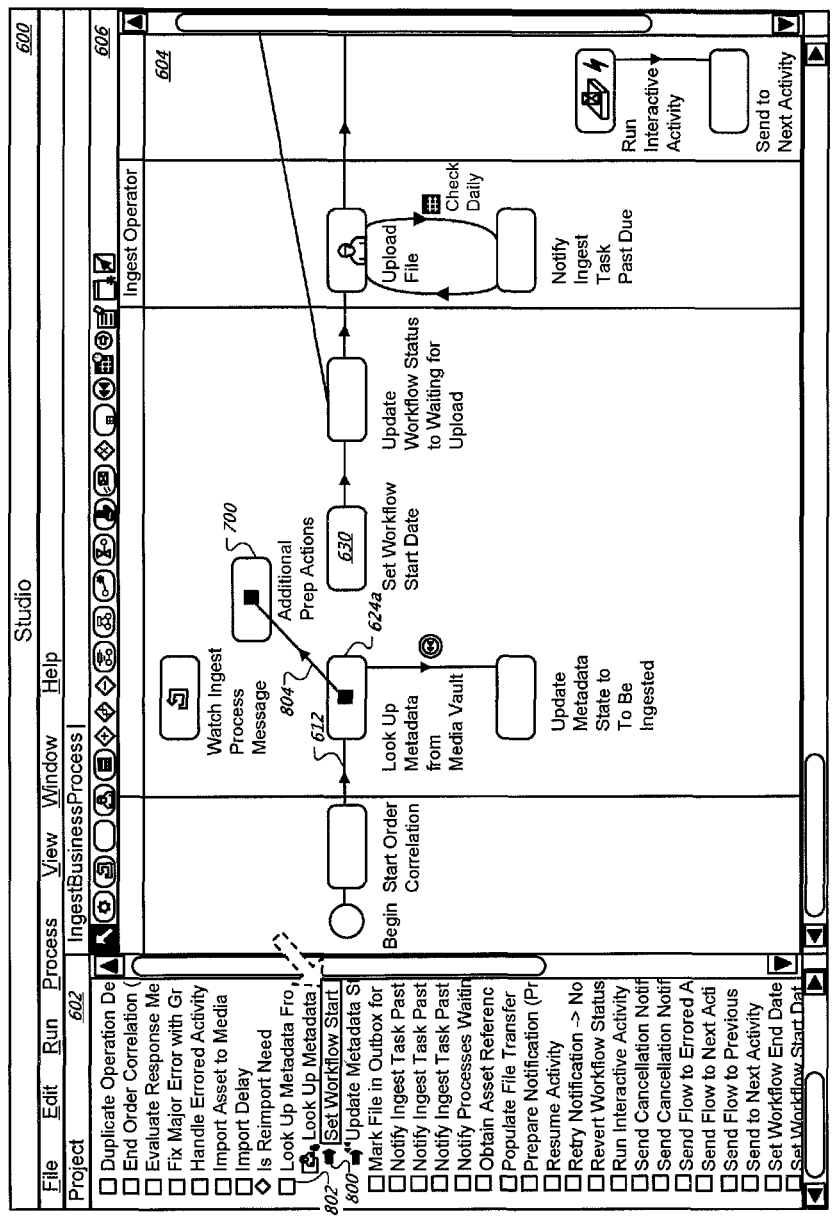
FIG. 8 depicts the user interface of FIG. 7, in a state after a user has begun to link the new activity into the digital content distribution process.

FIG. 8 depicts the user interface 600 of FIG. 7, in a state after a user has begun to link the additional prep actions activity 700 into the digital content distribution process. A pipeline segment 804 has been added between the look up metadata from media vault sub-activity 624*a* and the additional prep actions activity 700. The segment of the ingestion activity pipeline 612 between the look up metadata from media vault sub-activity 624*a* and the set workflow start date activity 630 has been removed. Within the template menu 602, a set workflow start date connector 800 is highlighted. The set workflow start date connector 800 is located within a look up metadata from media vault sub-directory 802 of the INGESTBUSINESS PROCESS folder 608 (not currently visible within the template menu 602). The user is redirecting the set workflow start date connector 800 (e.g., the pipeline segment 804) from the set workflow start date activity 630 to the additional prep actions activity 700.

Figure 9:
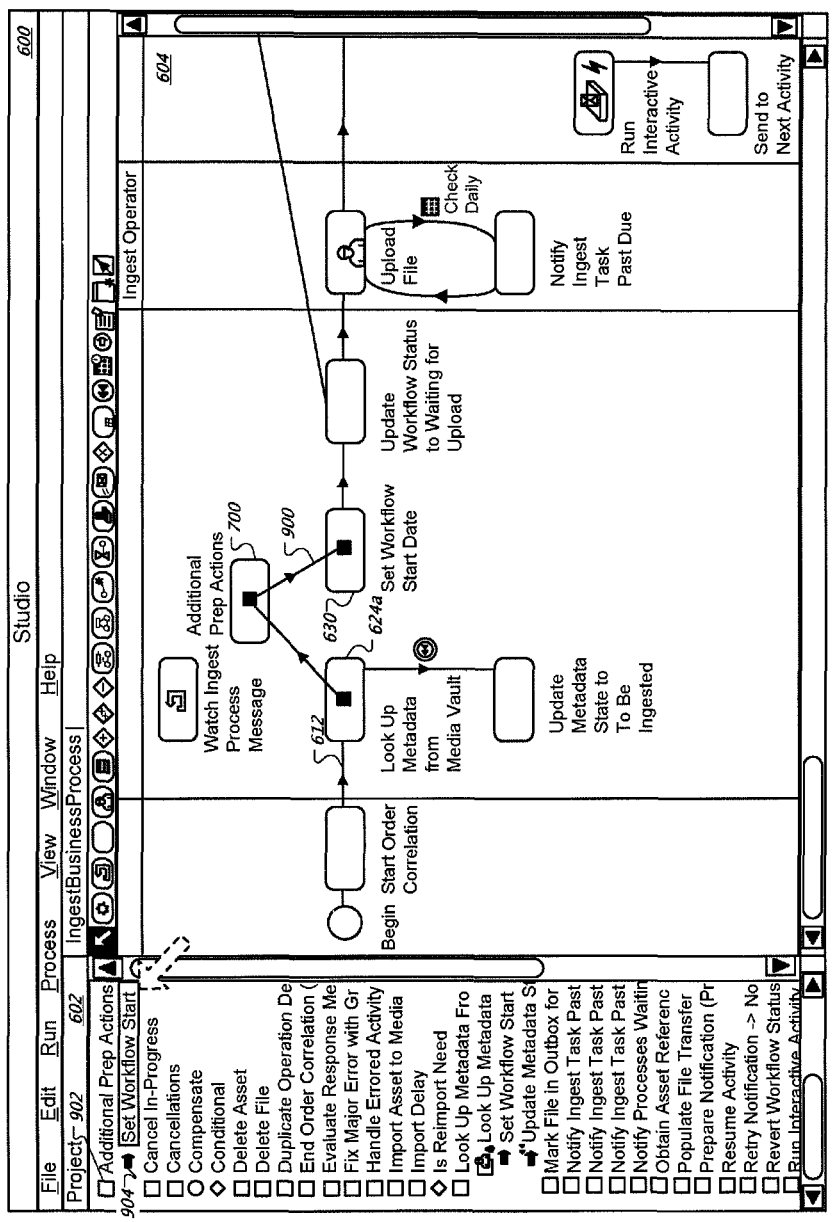
FIG. 9 depicts the user interface of FIG. 8, in a state after a user has finished linking the new activity into the digital content distribution process.

FIG. 9 depicts the user interface 600 of FIG. 8, in a state after a user has finished linking the additional prep actions activity 700 into the digital content distribution process. Continuing the editing process, a pipeline segment 900 has been added between the additional prep actions activity 700 and the set workflow start date activity 630 within the editing pane 604. The pipeline segment 900 completes the connection of the activity 700 into the ingestion activity pipeline 612. Within the template menu 602, a set workflow start date connector 904 has been added to an additional prep actions directory 902 within the INGESTbUSINESSPROCESS folder 608 (not currently visible within the template menu 602).

Figure 10:
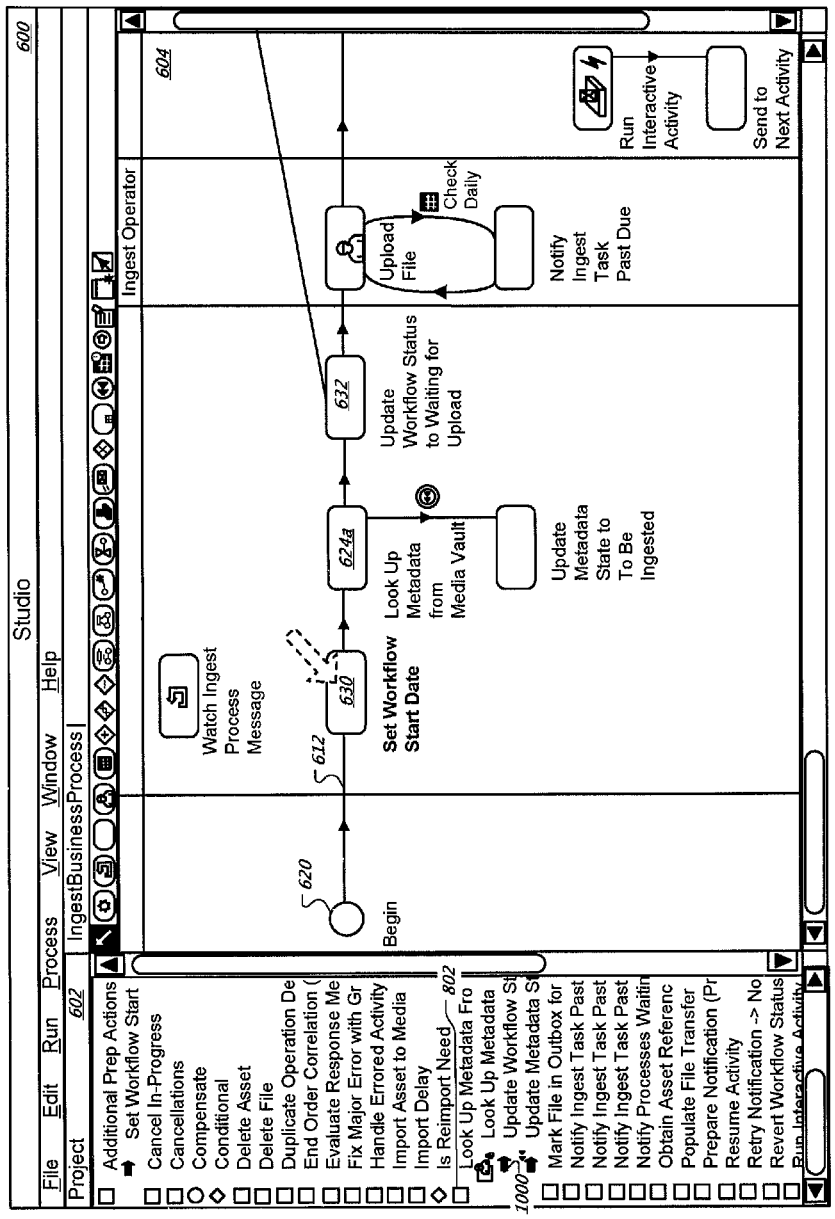
FIG. 10 depicts the user interface of FIG. 6, in a state after a user has rearranged the digital content distribution process.

FIG. 10 depicts the user interface 600 of FIG. 6, in a state after a user has rearranged the digital content distribution process. The start order correlation activity 622, as shown in FIG. 6, has been removed. The user has additionally moved the set workflow start date 630 activity from after the look up metadata from media vault sub-activity 624*a* to between the begin activity 620 and the look up metadata from media vault sub-activity 624*a*. The user may, for example, have dragged and dropped the set workflow start date activity 630 into the new location. The ingestion activity pipeline 612 now includes the begin activity 620, followed by the set workflow start date activity 630, followed by the look up metadata from media vault sub-activity 624*a*, followed by the update workflow status to waiting for upload activity 632.

Within the template menu 602, an update workflow status to waiting for upload connector 1000 is now included beneath the look up metadata from media vault directory 802. Similarly, though not pictured, a look up metadata from media vault connector may appear within the set workflow start date directory, and a set workflow start date connector may appear within the begin directory. Although the start order correlation activity 622 has been removed, in some implementations, the start order correlation activity template (not illustrated) may still exist within the template menu 602. In this manner, the start order correlation activity may be re-entered or used within a different customized business process.

FIGS. 11A through 11D depict a process flow diagram illustrating exemplary activities within the ingestion business process flow 1100 of a digital content distribution process. The ingestion business process flow 1100 may be executed to ingest a digital master into a secure long-term storage location such as the digital vault 128 as illustrated in FIG. 1. An ingestion instance of the ingestion business process flow 1100, for example, may be instantiated based upon a request message generated by a user interface to begin ingesting digital content. The ingestion business process flow 1100 of the digital content distribution process may have been modeled, for example, using the user interface 600 as shown in FIG. 6. The ingestion business process flow 1100 includes an ingest activity pipeline 1101 which models the flow between individual activities and/or sub-activities.

The ingestion business process flow 1100 is responsible for ingesting a digital content asset given an inputted task argument. The task argument, for example, may be included in a message generated by a user interface to begin ingesting the content. Each task has metadata associated with it. When the task is generated (given the order), order metadata associated to that task populates that task. The metadata is populated via the tasks arguments. The task may be constructed by one of the parent flows of the ingestion business process flow 110 and contains all of the information required for the job.

The metadata store, Metadata Management Module (, is queried for information associated to the Unique Material Identifier (UMID) on the task. The UMID, as used herein, is assigned as the digital asset identifier and, as such, is applied to every digital asset created in the DETE system. The UMID may be stored as a string value. This information is exposed to the user interface so that an encode operator or administrator may associate the ingestion instance of the ingestion business process flow 1100 to a given order.

The encode operator uploads a file describing the digital content asset, referred to as the physical master. The files are transferred from the node that the encode operator is working on to the digital vault inbound storage node. Once the files have been transferred to the inbound storage destination, the Asset File Transfer Module is invoked to import them into the digital vault. The Asset File Transfer Module is updated with the newest information regarding the encoded digital content asset.

During the processing of the ingestion instance, key variables are exposed to the user interface so that the progress of the ingestion instance may be monitored. For example, a start time key variable contains the system time at which the ingestion instance was instantiated, while an end time key variable will contain the system time at which the ingestion instance is completed. A workflow status key variable is updated with a value pertaining to the task presently being executed. Examples of workflow status values may include "waiting for upload", "uploading", "ingesting", "in", "cancelled", and "error".

Figure 11A:
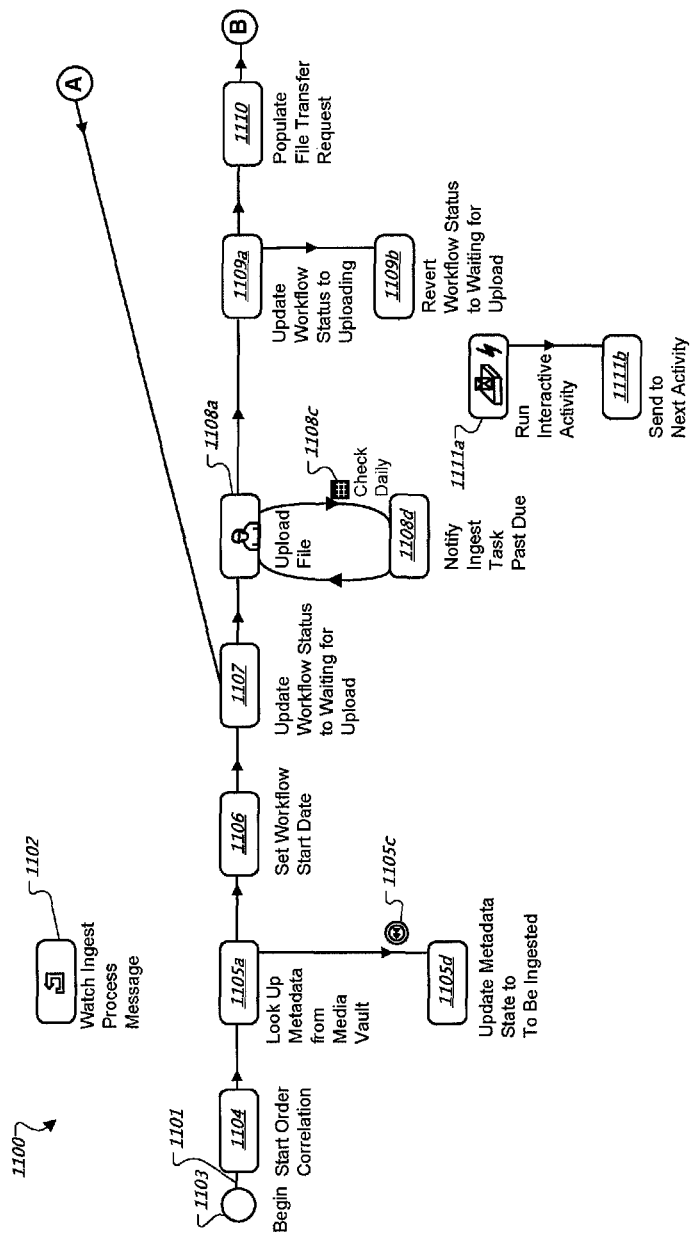
FIGS. 11A through 11D are a process flow diagram illustrating exemplary activities within the pipeline of the ingestion business process flow of a digital content distribution process.

As shown in FIG. 11A, the ingestion business process flow 1100 includes a watch ingest process message activity 1102. The watch ingest process message activity 1102 is positioned above and disconnected from the ingest activity pipeline 1102. When the watch ingest process message activity 1102 is invoked, a message queue is monitored for messages belonging to the ingest process. Messages may come from the user interface to process the interactive activity or from external network interface services (e.g., via the external interface 420 as shown in FIG. 4) for asynchronous call backs.

Queues, as used herein, are used to receive all messages that are being sent to the business processes (e.g., the ingestion business process 1100, the servicing business process 1200 as shown in FIGS. 12A through 12E, etc.). The messages, in some implementations, may be received as Extensible Markup Language (XML) objects and then converted into XML strings. The queues may deliver the XML message strings to the respective business processes. Once the messages are received, the XML strings may be converted back to the appropriate objects.

Once the XML objects are created, the processes may process the information these objects contain and move forward. If, for example, a message is received on the ingest queue, the watch ingest process message activity 1102 will recognize it and assign it to its message variable. A message variable, as used herein, describes a type of string which is used to hold any messages that are going to be displayed via notifications. The message variable is stored as part of the business process instance information. The message has its action assigned in the header.

If the message signifies that an import operation has completed, the message is parsed into the import response object so that the relevant data may be read from it. A response object, as used herein, is the generic name for the information that comes back from an external interface service call. The response object includes a correlation identifier which is used to find the specific instance of the ingestion business process flow 1100 that is going to be notified. A correlation identifier, as used herein, is used to identify specific running instances of business processes. The correlation identifier may be formatted as a string value comprised of the transaction identifier plus the current time stamp.

The transaction identifier, as used herein, refers to a randomly generated unique identifier used to track at the order level. The transaction identifier is stored as part of the business process instance information. The transaction identifier, for example, may be stored as a string. The correlation identifier may be used for external interface service call backs, for example, to ensure that the message makes it back to the calling process. The correlation identifier is stored as part of the business process instance information. The business project management database system finds the instance and passes the response object to it for further processing.

If the message received by the ingest process message activity 1102 signifies that an upload operation has taken place, the message is parsed into the upload request object so that relevant data may be read from it. A request object, as used herein, is the generic name for the information that goes out to an external interface service call. The task identifier is parsed from the object to look up the correlation identifier. A watch ingest process message activity helper method may be used to retrieve the correlation identifier by the task identifier from the business project management database. The task identifier, as used herein, is an integer value given to each task created through the ordering process. The task identifier is unique to every task (e.g., ingestion task, servicing task, etc.).

The task identifier is generated via a database master sequence. The task identifier is stored in the digital end-to-end (DETE) database as well as on the business process instance it is associated with. The business project management database system finds the instance based on the correlation identifier and passes the request object to it for further processing. User name and member name are pulled from the request so they may be assigned to instance variables for immediate processing. If the watch ingest process message activity 1102 does not recognize the operation associated with the message a message is logged with the operation.

The ingest activity pipeline 1101 begins with a begin activity 1103. The begin activity 1103 of the ingest process business flow 1100 takes a generic task object as its input to complete an ingest. Several key business variables are set so they may be exposed to the user interface and written to the database. Business variables, as used herein, relate to variables which are externally facing (e.g., global), being available to the business project management database system, metric dashboards, the project level processing tasks, etc. The business variables are stored on the internal business project management engine database rather than as part of a particular instance. Various values are pulled from the task object during execution of the begin activity 1106 and assigned to business variables.

A start order correlation activity 1104 follows the begin activity 1103. The start order correlation activity 1104 sets up an order correlation so that an external process trying to notify this business process, as in the case of cancellation or fix, may reach the business process.

A unique correlation identifier is created by taking the current timestamp and appending it to the associated transaction identifier. The correlation capabilities in the business project management database system may be utilized by naming the correlation identifier and giving it the value that should be used. In this case, "IngestCorrelation" may be used, for example, to signify that it is generic enough to be used for the entire process.

The instance identifier is set at this point so that it may be written to the archive tables later in the process. As used herein, an instance identifier is an internal unique identifier that is assigned to a created instance. The instance identifier is used mostly for internal tasks, such as one business process calling another business process. The instance identifier is stored in the internal engine database. Setting this instance identifier helps identify which version of the project enterprise archive file a particular instance is running on. In order to publish a business project management database system project to an enterprise environment, the project enterprise archive file is first generated. The project enterprise archive file may be generated through the business project management database system process administrator once the overall project is selected, exploded, and deployed.

A look up metadata from media vault sub-activity 1105a follows the start order correlation activity 1104. The look up metadata from media vault sub-activity 1105a coordinates with an update metadata state to 'to be ingested' sub-activity 1105d. The look up metadata from media vault sub-activity 1105a queries the metadata of the associated UMID to populate the business variables. The business variables, as used herein, are global variables which may be displayed on the business project management database system user interface as well as used for metric dashboards.

The business variables are also available at the project level. The business variables are not stored as part of a particular instance, but rather are stored on the internal business project management engine database. The look up metadata from media vault sub-activity 1105a exposes the values found within the metadata of the UMID to the user interface and the database. The current instance information is persisted to the database for workflow monitoring purposes.

A look up metadata from media vault sub-activity helper method accepts a UMID for reading asset information. The look up metadata from media vault sub-activity helper method may be utilized to perform the business variable population activity. The relevant business variables are populated from the response object with the appropriate values. Another helper method accepting the title UMID may be utilized to obtain further information about the asset.

If a look up metadata from media vault sub-activity compensation 1105c is desired for a metadata update request, the update metadata state to 'to be ingested' sub-activity 1105d is executed to revert the state back to its original value. An update metadata state to 'to be ingested' sub-activity helper method may be utilized to update the metadata state information of a given UMID.

A set workflow start date activity 1106 follows the look up metadata from media vault sub-activity 1105a. The set workflow start date activity 1106 sets the start time business variable with the current system time to be used in the workflow monitor page. The current instance information is persisted to the database for workflow monitoring purposes. The current system time, for example, may be set with the business project management database system key word "now". The end time is set to null to ensure it doesn't have a value until the end of the flow.

An update workflow status to waiting for upload activity 1107 follows the set workflow start date activity 1106. The update workflow status to waiting for upload activity 1107 sets the workflow status business variable to "waiting for upload" to be used in the workflow monitor page. This status also indicates to the user interface that there is a pending ingestion task waiting for attention. The current instance information is persisted to the database for workflow monitoring purposes. A flag is set to signify that the interactive activity has not been run yet.

An upload file sub-activity 1108a follows the update workflow status to waiting for upload activity 1107. The upload file sub-activity 1108a coordinates with a notify ingestion task past due sub-activity 1108d. The upload file sub-activity 1108a allows the process instance to appear as one involving human interaction. The encode XML with metadata of the actual encoded asset is uploaded at this point through the DETE user interface.

The upload file sub-activity 1108a may also be executed by a send to next activity sub-activity 1111b if the upload file sub-activity 1108a has not already been executed before. The flag to signify that the upload file sub-activity 1108a has been executed is set to true and the encode XML is mapped to an instance variable for use by the rest of the process.

An upload file check daily transition 1108c is invoked to check the progress of the upload file sub-activity 1108a. If the instance is still at the upload file sub-activity 1108a at the time of execution, the check daily sub-activity 1108c may transition the process from the upload file sub-activity 1108a to the notify ingestion task past due sub-activity 1108d.

If an order is past due, the notify ingestion task past due sub-activity 1108d sends a notification to the requestor along with data to allow the recipient to know which order has been delayed. The current time is compared to the due date of the order and if it is delayed the notification message is constructed with instance data. A helper method is used for the relevant notification accepting each variable as a parameter.

An update workflow status to uploading sub-activity 1109a follows the upload file sub-activity 1108a. The update workflow status to uploading sub-activity 1109a coordinates with a revert workflow status to waiting for upload sub-activity 1109b. The update workflow status to uploading sub-activity 1109a sets the workflow status business variable to "uploading" to be used in the workflow monitor page. This status allows the user to see that a file transfer is about to start or is in progress. The current instance information is persisted to the database for workflow monitoring purposes.

The revert workflow status to waiting for upload sub-activity 1109b sets the workflow status business variable to "waiting for upload" to be used in the workflow monitor page. This status also indicates to the user interface that there is a pending ingestion task waiting for attention.

Figure 11B:
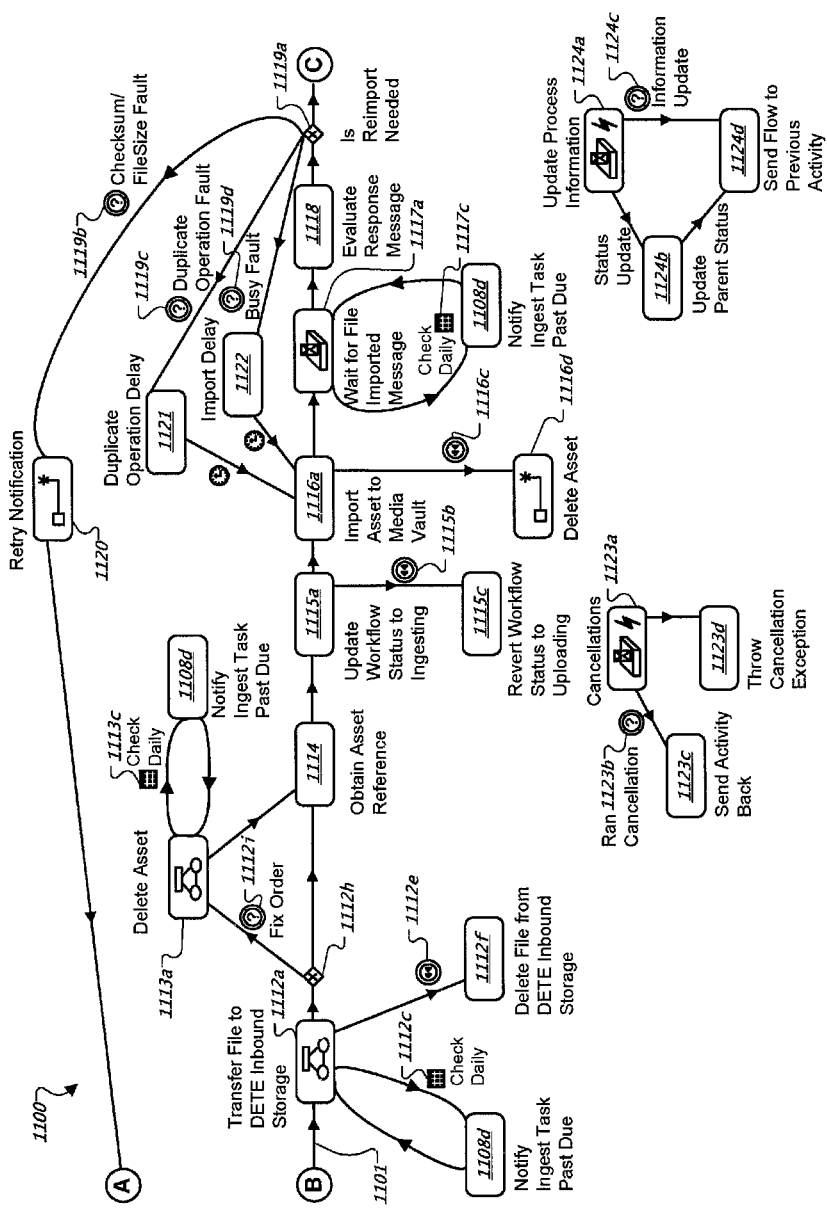

A populate file transfer request activity 1110 follows the update workflow status to uploading sub-activity 1109a. Before calling a transfer file to DETE inbound storage sub-activity 1112a (as shown in FIG. 11B), the input argument to the transfer file to DETE inbound storage sub-activity 1112a is filled out with the relevant information to be able to successfully transfer a file. The populate file transfer request activity 1110 aggregates information from the encode XML as well as the task object to accomplish this.

The destination file names, in some implementations, are named after the task identifier with their proper respective extensions. This may be done to standardize the naming and have a means of tracking which instance of the ingestion business process flow 1100 the particular file belongs to. The file names and file sizes are parsed from the encode XML. The source delivery profile is queried by the encoder's member name and the delivery mechanism. The encoder's member name, as used herein, refers to the group that encoder (who encoded the digital asset) belongs to.

The destination delivery profile is queried by the task's member name and the task delivery mechanism. The task's member name, as used herein, refers to the recipient who will either receive the results of an order or who the order was prepared for. The task delivery mechanism, as used herein, describes the method in which the results of the task will be delivered. For example, if the recipient of the order may only receive the digital content via a specific file transfer protocol (e.g., Aspera Scp by Aspera Inc. of Emeryville, Calif.), then that is the delivery mechanism. However, if another recipient may only receive files via another protocol (e.g., Smartlog by Smartjog of Paris, France), then the delivery mechanism will represent that associated value. All of this information is assigned to the request object along with the encoder's user name and the delivery mechanism of the ingestion business process flow 1100. The encoder's user name, as used herein, is the name of the actual user who has encoded the given digital content asset.

The ingestion business process flow 1100 also includes a run interactive activity sub-activity 1111a which coordinates with a send to next activity sub-activity 1111b. The run interactive activity sub-activity 1111a and the send to next activity sub-activity 1111b are positioned beneath and disconnected from the ingest activity pipeline 1102. A notification interrupt allows messages to be received outside of the main flow, effectively interrupting whatever it was working on. The run interactive activity sub-activity 1111a receives messages from the exception queue monitor to execute a specific interactive activity.

The send to next activity sub-activity 1111b sends the instance back to the main flow of the ingestion business process flow 1100 to continue processing. If the interactive activity denoted within the run interactive activity sub-activity 1111a has not been run, it will run and continue to the next activity. If the denoted interactive activity has already been run, the instance will merely be sent back to the main flow of the ingest activity pipeline 1102 from where it was interrupted. The send to next activity sub-activity 1111b, for example, may be set up with an allow interruptions and process immediately configuration.

As shown in FIG. 11B, the transfer file to DETE inbound storage sub-activity 1112a follows the populate file transfer request activity 1110 (illustrated in FIG. 11A) within the ingest activity pipeline 1101. The transfer file to DETE inbound storage sub-activity 1112a coordinates with a notify ingestion task past due sub-activity 1108d and a delete file from DETE inbound storage sub-activity 1112f. The transfer file to DETE inbound storage sub-activity 1112a transfers files from the source to the destination according to the file transfer request object. The source file may be sent from the node associated with the source delivery profile to the destination associated with the destination delivery profile using the transfer mechanism specified in the request object. The source delivery profile, as used herein, is a profile associated with where the digital files are being sent from. The profiles are stored in the DETE database.

During ingest, for example, the source profile may be related to the different vendors who are adding content. While servicing, in another example, the source file may be set to DETE, because DETE is sending files to recipients. A transfer file to DETE inbound storage check daily transition 1112c transitions execution to the notify ingestion task past due sub-activity 1108d if the instance is still executing the transfer file to DETE inbound storage sub-activity 1112a at time of check.

Returning to the transfer file to DETE inbound storage sub-activity 1112a, if a transfer file to DETE inbound storage compensation 1112e is desired, a delete file from DETE inbound storage sub-activity 1112f is invoked. The delete file from DETE inbound storage sub-activity 1112f deletes the file that is sitting in the inbound storage destination to keep unwanted files from taking up valuable space and getting lost on the server.

A delete file from DETE inbound storage sub-activity helper method may be utilized to remove files from an arbitrary storage pool. The Uniform Resource Identifier (URI) to the inbound storage destination along with the file names are passed as parameters.

Returning to the transfer file to DETE inbound storage sub-activity 1112a, if the order specified the ingest process is to be a fix as opposed to a new one (e.g., recovering from an exception), the digital content already in the digital vault may be removed. A transfer file to DETE inbound storage fix order sub-activity 1112i transitions execution to a delete asset sub-activity 1113a based upon the status of a conditional. For example, the delete asset sub-activity 1113a may be invoked due to the recognition of a duplicate asset. The delete asset sub-activity 1113a coordinates with the notify ingestion task past due sub-activity 1008d. The delete asset sub-activity 1113a removes the asset associated with the UMID supplied by the calling activity.

A delete asset check daily transition 1113c transitions execution from the delete asset sub-activity 1113a to the notify ingestion task past due sub-activity 1108d if the delete asset sub-activity 1113a is still active at the time of check. The delete asset sub-activity 1113a or, if not the fix order 1112i, the transfer file to DETE inbound storage 1112a transfers activity to an obtain asset reference activity 1114.

The obtain asset reference activity 1114 retrieves the file references for the specified digital content asset so that the workflow will know where to remove files in the digital vault. The obtain asset reference activity 1114 utilizes an obtain asset reference helper method to retrieve the asset references from the digital media database based on the digital master identifier.

An update workflow status to ingesting sub-activity 1115a follows the obtain asset reference activity 1114. The update workflow status to ingesting sub-activity 1115a coordinates with a revert workflow status to uploading sub-activity 1115c. The update workflow status to ingesting sub-activity 1115a sets the workflow status business variable to "ingesting" to be used on the workflow monitor page of the DETE user interface. This status allows the user to see that the digital content asset is being imported into the digital vault. A flag is set to signify that an ingestion task is taking place. In some implementations, any attempts to cancel during this time are rejected. The current instance information is persisted to the database for workflow monitoring purposes.

If an update workflow status to ingesting compensation 1115b is desired, the revert workflow status to uploading sub-activity 1115c sets the workflow status business variable to "uploading" to be used in the workflow monitor page. This status allows the user to see that a file transfer is about to start or is in progress.

An import asset to digital media sub-activity 1116a follows the update workflow status to ingesting sub-activity 1115a. The import asset to digital media sub-activity 1116a coordinates with a delete asset sub-activity 1116d. The import asset to digital media sub-activity 1116a imports the digital content files that are sitting on the DETE inbound storage destination into the digital vault.

The timeout for the import asset to media vault sub-activity 1116a is set for a delay determined by a business parameter. An increased timeout may be desired for the import asset to media vault sub-activity 1116a since the import might receive a busy fault. A busy fault, as used herein, describes a fault that occurs when another operation is active and thus the transmitted request may not be processed. By adjusting the business parameter, the number of retries may be set before an exception is thrown. An import asset to media vault helper method may be utilized to perform the import of the digital content asset. The digital content asset reference, task object information, file names and one or more specific digital vault URIs are passed into the import asset to media vault helper method as parameters. A correlation identifier may also be passed to the external interface service to identify which instance should be notified.

If the import asset to media vault compensation 1116c is desired, the delete asset sub-activity 1116d is invoked. The delete asset sub-activity 1116d, for example, may delete the asset due to a failure condition.

A wait for file imported message sub-activity 1117a follows the import asset to media vault sub-activity 1116a. The wait for file imported message sub-activity 1117a coordinates with the notify ingestion task past due sub-activity 1108d. The active instance of the ingestion business process flow 1100 will sit indefinitely at the wait for file imported message sub-activity 1117a waiting for a notification from the watch ingest process message activity 1102. If a message intended for a particular instance is received by the wait for file imported message sub-activity 1117a, the wait for file imported message sub-activity 1117a will transition to the next activity. The wait for file imported message sub-activity 1117a accepts the import response object for further processing.

If the wait for file imported message sub-activity 1117a is still active at time of check, a wait for file imported message check daily transition 1117c will transition execution of the active instance of the ingestion business process flow 1100 to the notify ingestion task past due sub-activity 1108d.

An evaluate response message activity 1118 follows the wait for file imported message sub-activity 1117a. The evaluate response message activity 1118 evaluates the import response to determine if any action is desired. The job status, fault code and status message are parsed from the response object. If the job status indicates failure, then the fault code is further analyzed by an is reimport needed decision marker 1119a to determine what type of failure occurred.

If a checksum or file size fault occurred a notification is sent to the encoder. A notification helper method is used to set up the notification message to inform the encoders and/or ingestors of this error with key information for them to act upon. A flag is set indicating that a notification should be set and a re-upload is desired.

If a busy fault or duplicate operation fault occurs, a flag is set indicating that a delay should occur before an import request may be called again. A duplicate operation fault, as used herein, refers to a fault that occurs when an incoming request for moving digital content to or from the digital vault matches the digital content which is in the progress of moving in or out of the digital vault. If a different type of fault occurred an exception is thrown along with key information to be sent in the email to the administrator.

If a checksum/file size decision marker 1119*b* determines that the fault checksum/file size flag is set, the ingestion business process flow 1100 will transition to a retry notification activity 1120. The notification object created before invocation of the retry notification activity 1120 is passed to the retry notification activity 1120 as an argument. The notification will be sent to the recipient specified. The retry notification activity 1120 transitions to the update workflow status to waiting for upload activity 1107 (as shown in FIG. 11A).

Returning to the is reimport needed decision marker 1119*a*, if a duplicate operation fault decision marker 1119*c* determines that the duplicate operation flag is set, the ingestion business process flow 1100 transitions to a duplicate operation delay activity 1121. The duplicate operation delay activity 1121 initiates a delay before re-invoking the subsequent request. The delay, determined by the business parameter, is used to set up the due transition. After the specified amount of time, the duplicate operation delay activity 1121 transitions to the import asset to digital media sub-activity 1116*a*.

Returning to the is reimport needed decision marker 1119*a*, if the busy fault decision marker 1119*d* determines that the duplicate operation flag is set, the instance will transition to an import delay activity 1122. The import delay activity 1122 initiates a delay before re-invoking the subsequent request. The delay, determined by the business parameter, is used to set up the due transition. After the specified amount of time, the import delay activity 1122 transitions to the import asset to digital media sub-activity 1116*a*.

Figure 11C:
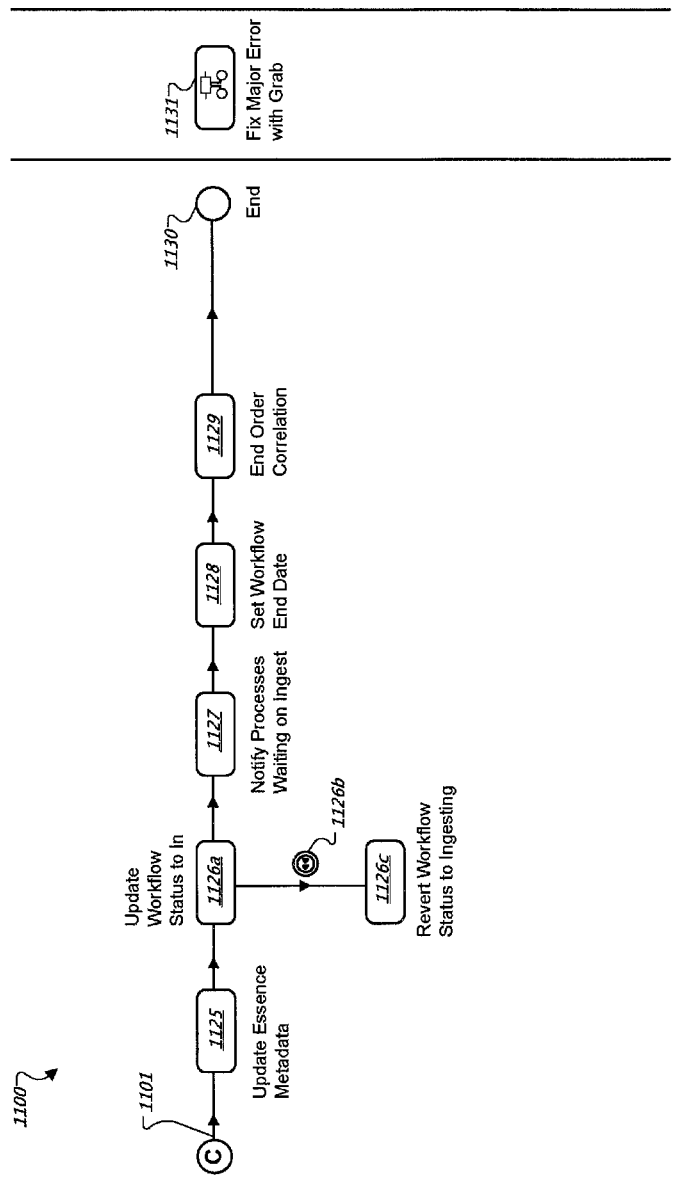

Returning to the is reimport needed decision marker 1119*a*, if no fault flag is set, the ingestion business process flow 1100 transitions to an update essence metadata activity 1125 (as shown in FIG. 11C).

The ingestion business process flow 1100 also includes a cancellations sub-activity 1123*a* which coordinates with a send activity back sub-activity 1123*c* and a throw cancellation exception activity 1123*d*. The cancellations sub-activity 1123*a*, the send activity back sub-activity 1123*c*, and the throw cancellation exception activity 1123*d* are positioned beneath and disconnected from the ingest activity pipeline 1101. A notification interrupt allows messages to be received outside of the main flow of the active instance of the ingestion business process flow 1100, effectively interrupting whatever the active instance of the ingestion business process flow 1100 was working on.

The cancellations sub-activity 1123*a* receives messages from asset management ingest. Asset management ingest, for example, can handle interrupts received from an external process, such as a portal or an external program. A cancellation order may have reached asset management ingest, at which point the cancellations sub-activity 1123*a* notifies Ingest to tell Ingest to stop processing. The cancellations sub-activity 1123*a* is set up with an input argument to accept correlations. Allow interruptions and process immediately may be configured since a cancellation may come at any point in the process.

If the ran cancellation decision marker 1123*b* determines that a cancellation has already been executed, then the active instance of the ingestion business process flow 1100 is sent back to the part of the main flow from where it was interrupted by the send activity back sub-activity 1123*c*. The key word ACTION, for example, may be used to direct the flow of the active instance of the ingestion business process flow 1100 in the business project management database system. In this case, a key word value of BACK may be used to send the active instance of the ingestion business process flow 1100 to the part of the main flow of the ingest activity pipeline 1101 from which the active instance of the ingestion business process flow 1100 was interrupted.

Figure 11D:
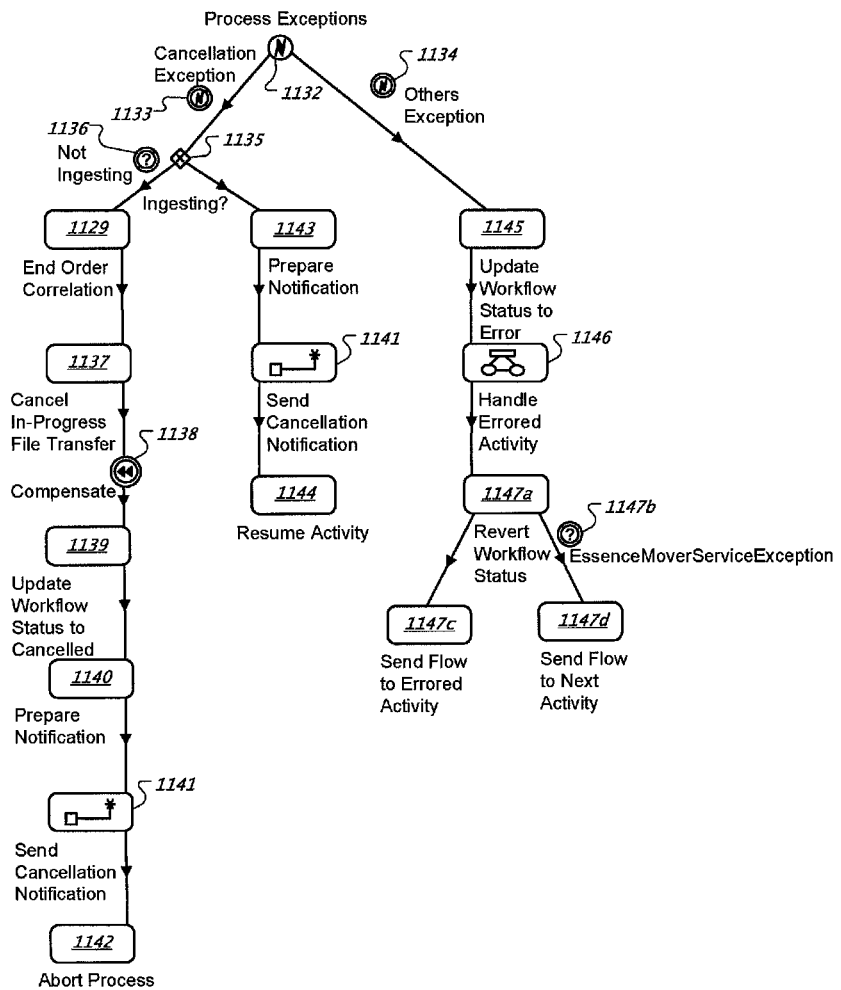

If a cancellation has not already been executed, a cancellation exception is thrown by the throw cancellation exception sub-activity 1123*d* so that a cancellation flow (e.g., a process exceptions sub-flow 1132 as shown in FIG. 11D) may be executed. A custom exception is thrown by the throw cancellation exception sub-activity 1123*d* so that the process level exception handling may catch it to start executing the cancellation flow.

The ingestion business process flow 1100 also includes an update process information sub-activity 1124*a* which coordinates with an update parent status sub-activity 1124*b* and a send flow to previous activity sub-activity 1124*d*. The update process information sub-activity 1124*a*, the status update sub-activity 1124*b*, and the send flow to previous activity sub-activity 1124*d* are positioned beneath and disconnected from the ingest activity pipeline 1101. A notification interrupt allows messages to be received outside of the main flow of the active instance of the ingestion business process flow 1100, effectively interrupting whatever the active instance of the ingestion business process flow 1100 was working on.

The update process information sub-activity 1124*a* receives messages from other business process flows, such as order propagation, file transfer, or asset management. Order propagation updates the media order number that was generated when creating the order in the external system, File transfer updates the instance status to error if there was any problem with the active instance of the ingestion business process flow 1100, and asset management updates the active instance of the ingestion business process flow 1100 with the parent barcode.

The update process information sub-activity 1124*a* is set up with three input arguments for each of the processes that will be invoking the update process information sub-activity 1124*a*. Allow interruptions and process immediately is configured since the information may become available at any point in the process. If the interrupt was invoked to update information in the active instance of the ingestion business process flow 1100, process control is sent immediately back to the point of interruption by the send flow to previous activity sub-activity 1124*d*. The key word ACTION, for example, may be used to direct the flow of the active instance of the ingestion business process flow 1100 in the business project management database system. In this case BACK is used to send the active instance of the ingestion business process flow 1100 to the part of the main flow of the ingest activity pipeline 1102 from which the active instance of the ingestion business process flow 1100 was interrupted.

If the interrupt received by the update process information sub-activity 1124*a* signifies that the child process has resumed normal processing, control transitions to the update parent status sub-activity 1124*b*. If a child process is not in an errored state any more, the original state of the parent is reverted back to its original value. If the child status is not "revert" this signifies that the child process is not in an errored state any more and should be reverted back to its original state. The child status is reset back to an empty string so that further executions of the update parent status sub-activity 1124*b* will only happen when required. If the child status is set to "revert", the state of the active instance of the ingestion business process flow 1100 is set back to what it originally was.

As shown in FIG. 11C, the update essence metadata activity 1125 follows the is reimport needed decision marker 1119*a* (as shown in FIG. 11B). The update essence metadata activity 1125 updates the metadata store with the most current information of the asset. Additional details not available during the initial asset shell creation are also added at this point. In some implementations, the encode XML is parsed into the encode object to pass to an update essence metadata helper method. The update essence metadata helper method accepts this encode object to parse relevant data to update the Metadata Management Module. The UMID to update with this data is passed along with the filenames, state, and task identifier.

An update workflow status to in sub-activity 1126*a* follows the update essence metadata activity 1125. The update workflow status to in sub-activity 1126*a* coordinates with a revert workflow status to ingesting sub-activity 1126*c*. The update workflow status to in sub-activity 1126*a* sets the workflow status business variable to "in" to be used in the workflow monitor page. This status allows the user to see that the asset has successfully been ingested into the digital vault. The current instance information is persisted to the database for workflow monitoring purposes. If an update workflow status to in compensation 1126*b* is desired, the revert workflow status to ingesting sub-activity 1126*c* is invoked. The revert workflow status to ingesting sub-activity 1126*c* sets the workflow status business variable to "ingesting" to be used in the workflow monitor page. This status allows the user to see that the asset is being imported into the digital vault. A flag is set to signify that an ingest process is taking place.

A notify processes waiting on ingest activity 1127 follows the update workflow status to in sub-activity 1126*a*. The notify processes waiting on ingest activity 1127 notifies any active instance of the servicing process business flow 1200 (as shown in FIGS. 12A through 12E) waiting for the ingested asset. The business project management database is queried for active instances of the servicing business process flow 1200 which are waiting on a particular UMID. Each active instance found is notified to continue using the correlation identifier.

A set workflow end date activity 1128 follows the notify processes waiting on ingest activity 1127. The set workflow end date activity 1128 sets the end time business variable with the current system time to be used in the workflow monitor page. The current instance information is persisted to the database for workflow monitoring purposes. The current system time, for example, may be set with the business project management database system key word "now".

An end order correlation activity 1129 follows the set workflow end date activity 1128. The end order correlation activity 1129 removes the order correlation at the end of the process since the task has ended and there is no more chance to interrupt it. There is also no need to keep the correlation tables full of expired tasks and their instance ids if they may never be reached. In some implementations, the business project management database system provides a method to terminate correlations.

The ingest activity pipeline 1101 ends with an end activity 1130. The end activity 1130 of the ingestion business process flow 1100 ends the active instance of the flow 1100. A key business object is passed back to the parent so that it may complete its requirements. The business object that was created and populated throughout the process is now passed out to the caller of the process (if there is one).

A fix major error with grab activity 1131 is positioned beside the ingest activity pipeline 1101. If there is a situation where an instance should to continue but may not be handled by the normal exception handling process, the fix major error with grab activity 1131 allows it to be moved to an arbitrary point in the process. The fix major error with grab activity 1131 is set up with a from all/to all configuration with the abortable option. If the fix major error with grab activity 1131 is ever used, careful analysis may be done to determine what exactly is being skipped and what the various data dependencies are.

An exception handling hierarchy and business process are configurable within the business process customization application (e.g., using the user interface described in FIG. 6). Custom exceptions, all extensions of a generic exception, may be used throughout the business process flow to give meaningful information to the administrator. Exceptions that are not caught within a catch block may propagate to the process level exception handler. This path sends the active instance of the business process flow (e.g., the ingestion business process flow 1100) to the exception handling business process which will analyze the information contained in it and send notifications to the appropriate parties. A user interactive activity may be associated with the exception handling business process for an administrator to effectively retry the active instance at the point at which the exception was thrown. If a business process flow does not have an exception handling path, the exception may be re-thrown to the calling parent process(es) where the exception may be caught.

Some exceptions require different levels of severity to be associated to them. If an exception has a key word value of FATAL or ERROR, for example, the logging class records them as such which will trigger a dispatch to the administrator and create a ticket.

Cancellations and other interruptions may be treated like exceptions in that an exception object is thrown so that the active instance follows the exception path. From there, the exception handling process may recognize that it is an interrupt exception and handle it appropriately. Either scenario may require compensation, the act of rolling back committed data or otherwise undoing an action performed. Each activity or sub-activity that would benefit from compensation has a compensation sub-activity associated with it that executes when given the command. Compensation sub-activity logic is typically very simple and where appropriate it may be set up as "fire and forget".

As shown in FIG. 11D, the process exceptions sub-flow 1132 processes both cancellation exceptions via a cancellation exception branch 1133 and other exceptions via an others exception branch 1134.

Following the cancellation exception branch 1133, an ingesting activity decision marker 1135 determines whether the instance is ingesting and thus may not be cancelled. A check on the ingesting flag indicates which branch of the cancellation flow to go. If the instance is not in the process of ingesting 1136, the end order correlation activity 1129 is invoked.

A cancel in-progress file transfer activity 1137 follows the end order correlation activity 1129. If the cancellation was sent during a file transfer (e.g., during the transfer file to DETE inbound storage activity 1112*a*), the cancel in-progress file transfer activity 1137 cancels any in-progress tasks. The business process management database is queried to see if there are any pending file transfer processes and if there are, the corresponding correlation ids are pulled back. For each correlation identifier that was pulled, a cancel request is sent to the file transfer process.

A compensate activity 1138 follows the cancel in-progress file transfer activity 1137. The compensate activity 1138 executes all of the compensation activities (e.g., the update metadata state to 'to be ingested' sub-activity 1105*d*, the delete file from DETE inbound storage sub-activity 1112*f*, a delete asset sub-activity, etc.) associated to activities that have already been executed. During a cancellation, any activities that have executed are going to effectively be undone. Any activities that perform reads are thus ignored. In some implementations, the business project management database system may provide a compensate capability while keeping track in the back end what has already been run.

An update workflow status to cancelled activity 1139 follows the compensate activity 1138. The update workflow status to cancelled activity 1139 sets the workflow status business variable to "cancelled" to be used in the workflow monitor page. This status allows the user to see that the instance is in a cancelled state.

A prepare notification activity 1140 follows the update workflow status to cancelled activity 1139. The prepare notification activity 1140 prepares a notification for the Media Purchase Order (MPO) creator regarding the cancellation of the active instance of the ingestion business process flow 1100. A helper method may be utilized to send the proper notification. Relevant data associated to the instance may be sent as arguments so that the MPO creator knows which ingest instance was cancelled.

A send cancellation notification activity 1141 follows the prepare notification activity 1140. The send cancellation notification activity 1141 sends the cancellation notification by invoking the notification sub-flow. The notification object created before the send cancellation notification activity 1141 is passed to the send cancellation notification activity 1141 as an argument. The notification will be sent to the recipient specified.

An abort process activity 1142 follows the send cancellation notification activity 1141. The abort process activity 1142 sends the active instance of the ingestion business process flow 1100 to the end activity 1130 (as shown in FIG. 11C), effectively canceling the instance. The key word ACTION may be used to direct the flow of the active instance of the ingestion business process flow 1100 in the business process management database system. In this case a key word value of ABORT may be used to send the flow of the active instance of the ingestion business process flow 1100 to the end activity.

Returning to the ingesting activity decision marker 1135, if the instance is in the process of ingesting, a prepare notification activity 1143 is invoked. The prepare notification activity 1143 prepares a notification for the MPO creator to alert the creator that the ingestion task was unable to be cancelled. A helper method may be utilized to send the proper notification. Relevant data associated to the active instance of the ingestion business process flow 1100 is sent as arguments so that the MPO creator knows which ingest instance was not successfully cancelled.

The send cancellation notification activity 1141 follows the prepare notification activity 1143. A 'resume activity' activity 1144 follows the send cancellation notification activity 1141. The 'resume activity' activity 1144 sends the active instance of the ingestion business process flow 1100 back to the activity from which it was interrupted so that the active instance of the ingestion business process flow 1100 may retry the errored step. The key word ACTION may be used to direct the flow of the active instance of the ingestion business process flow 1100 in business process management database system. In this case a key word value of BACK, for example, may be used to send the flow of the active instance of the ingestion business process flow 1100 to the part of the main flow from which it was interrupted.

Returning to the process exception sub-flow 1132, following the others exception branch 1134, an update workflow status to error activity 1145 is invoked. The update workflow status to error activity 1145 sets the workflow status business variable to "error" to be used in the workflow monitor page. This status allows the user to see that the instance is in an errored state.

A 'handle errored activity' activity 1146 follows the update workflow status to error activity 1145. The 'handle errored activity' activity 1146 sends the instance to the exception sub-flow to handle the exception. The exception and context information is sent to the exception sub-flow. The exception information is sent to the administrator and shows up in a queue for further processing.

A revert workflow status sub-activity 1147*a* correlates with a send flow to errored activity sub-activity 1147*c* and a send flow to next activity sub-activity 1147*d*. The revert workflow status sub-activity 1147*a* sets the workflow status business variable back to its original value from the "error" state. Based upon an ESSENCEMOVERSERVICEEXCEPTION 1147*b*, the revert workflow status sub-activity 1147*a* selects the handling sub-activity.

If the ESSENCEMOVERSERVICEEXCEPTION 1147*b* value is false, the send flow to errored activity sub-activity 1147*c* is invoked. The send flow to errored activity sub-activity 1147*c* sends the active instance of the ingestion business process flow 1100 back to the activity from which it was interrupted so that the active instance of the ingestion business process flow 1100 may retry the errored step. The key word ACTION may be used to direct the flow of the active instance of the ingestion business process flow 1100 in the business process management database system. In this case the key word value of BACK may be used to send the active instance of the ingestion business process flow 1100 to the part of the main flow from which it was interrupted.

Returning to the revert workflow status sub-activity 1147*a*, if the ESSENCEMOVERSERVICEEXCEPTION 1147*b* value is true, the send flow to next activity sub-activity 1147*d* is invoked. The send flow to next activity sub-activity 1147*d* sends the active instance of the ingestion business process flow 1100 back to the activity from which it was interrupted so that the active instance of the ingestion business process flow 1100 may retry the errored step. The key word ACTION may be used to direct the flow of the active instance of the ingestion business process flow 1100 in the business process management database system. In this case the key word value of SKIP may be used to send the active instance of the ingestion business process flow 1100 to the part of the main flow after which it was interrupted.

FIGS. 12A through 12E depict a process flow diagram illustrating exemplary activities within the pipeline of a servicing business process flow 1200 of a digital content distribution process. The servicing business process flow 1200 may be executed to service digital content from the digital vault 128 to the end user 116 as illustrated in FIG. 1. The servicing business process flow 1200, for example, may be invoked based upon a servicing request received from a recipient. The servicing business process flow 1200 of the digital content distribution process may have been modeled, for example, using the user interface 600 as shown in FIG. 6. The servicing business process flow 1200 includes a servicing activity pipeline 1201 which models the flow between individual activities and/or sub-activities.

The servicing business process flow 1200 is responsible for servicing a digital content asset given a task passed to the servicing business process flow 1200 as an input argument. The task is constructed by one of its parent flows and contains all the necessary information to pMetadata Management Module, is queried for information associated to the UMID on the task. Depending on the current asset status, the servicing task will wait for its digital master to be ingested (e.g., by the ingestion business process flow 1100) before it may begin processing a digital copy based on the digital master.

Using the Asset File Transfer Module, a copy of the digital master source is created and moved to the operational storage (e.g., the temporary storage 302 as illustrated in FIG. 3). After that, various metadata is collected and packaged up into a request sent to the Media Vault Scheduler Service where content processing occurs on the digital copy. The request outlines what types of processing operations are requested to occur on the digital copy (e.g., size formatting, watermarking, encryption, etc.). One or more outputted files from content processing are placed into an outbound storage location for delivery to the recipient (e.g., using the external interface 420 as illustrated in FIG. 4). Once the status has been updated to "delivered," the digital copy file(s) sitting in the outbound storage location may be removed.

During the processing of the servicing instance, key variables are exposed to the user interface so that the progress of the servicing instance may be monitored. For example, a start time key variable contains the system time at which the servicing instance was instantiated, while an end time key variable will contain the system time at which the servicing instance is completed. A workflow status key variable is updated with a value pertaining to the task presently being executed. Examples of workflow status values may include "waiting for master", "source ready", "in progress", "cancelled", and "error".

Figure 12A:
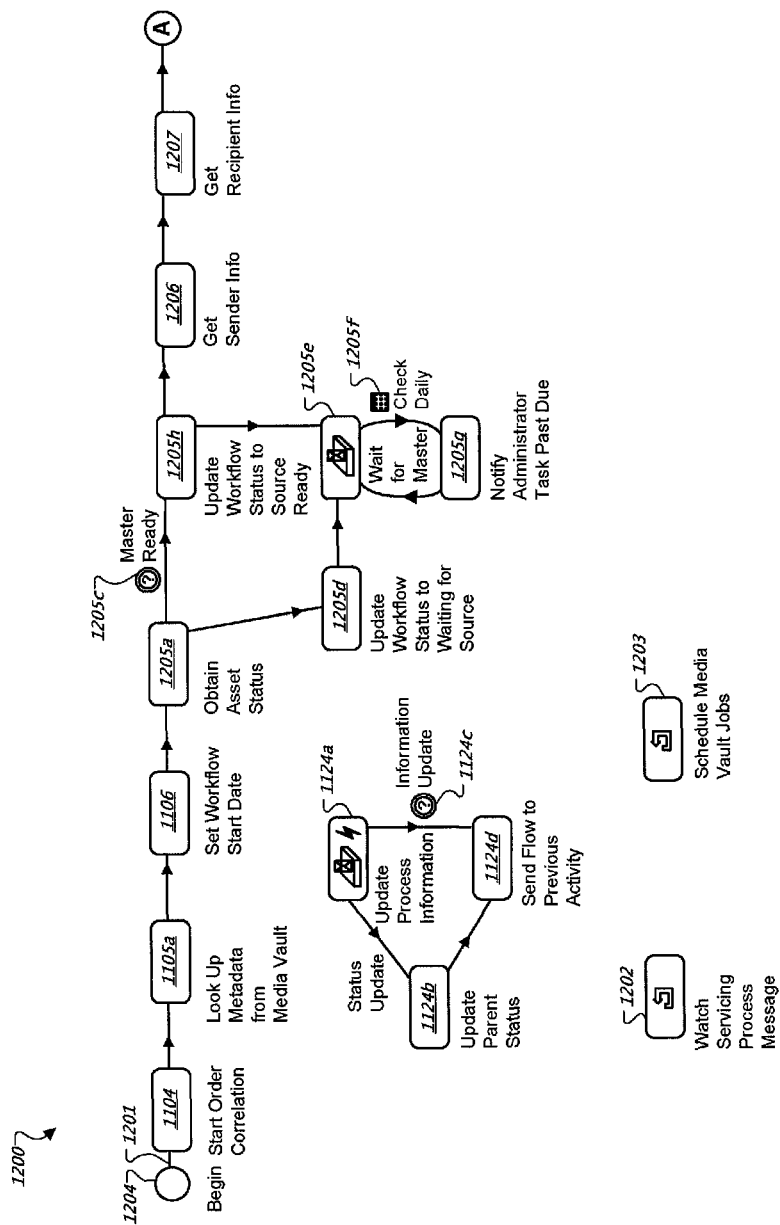
FIGS. 12A through 12E are a process flow diagram illustrating exemplary activities within the pipeline of the servicing business process flow of a digital content distribution process.

As shown in FIG. 12A, the servicing business process flow 1200 includes a watch servicing process message activity 1202. The watch servicing process message activity 1202 is positioned below and disconnected from the servicing activity pipeline 1201. When the watch servicing process message activity 1202 is invoked, the watch servicing process message activity 1202 monitors a queue for messages belonging to the active instance of the servicing business process flow 1200. Messages may come from the user interface or from external interface services (e.g., external entities 114 as described in FIG. 1) for asynchronous call backs.

If a message is received on the servicing queue, the watch servicing process message activity 1202 will recognize the message and assign it to its message variable. The message has its action assigned in the header and the action is used to determine where the message should be sent to.

The ESSENCEMOVER export notification returns a response object full of metadata. The ESSENCEMOVER export notification alerts the active instance of the servicing business process flow 1200 that the digital content asset has been copied to a local storage area (e.g., the temporary storage 302 as shown in FIG. 3).

TABLE 1

Exemplary Format of an EssenceMover Export Notification

```
<ser:notifyAFTMFileExport xmlns:ser=
"http://com/genericstudio/dete/ws/servicing">
    <res: AFTMResponse
xmlns:res="http://dete.genericstudio.com/digitalvault/ems/
webservices/2007/04/xsd/response/">
```

TABLE 1-continued

Exemplary Format of an EssenceMover Export Notification

```
        <res:JobId>string</res:JobId>
        <res:RequestorId>string</res:RequestorId>
        <res:CorrelationId>string</res:CorrelationId>
        <res:OperationType>string</res:OperationType>
        <res:JobSubmitDateTime>2006-09-28T18:49:45
        </res:JobSubmitDateTime>
        <res:JobStatus>SUCCESS</res:JobStatus>
        <!--Optional:-->
        <res:StatusMessage>string</res:StatusMessage>
        <!--Optional:-->
        <res:FaultCode>ASSET_OVERWRITE_FAULT
        </res:FaultCode>
        <!--Optional:-->
        <res:TapeIds>
            <!--Zero or more repetitions:-->
            <res:TapeId size="200">string</res:TapeId>
        </res:TapeIds>
    </res: AFTMResponse>
</ser:notifyAFTMFileExport>
```

The correlation identifier is used to check whether an open servicing process exists under this identifier. Once that is confirmed, the entire response is passed into the main flow. If the correlation identifier does not exist, the watch servicing process message activity 1202 sends a detailed notification to the administrator and throws an exception.

The media vault job notification returns, among other metadata, a job identifier, correlation identifier, and a status message.

TABLE 2

Exemplary Format of a Media Vault Job Notification

```
<ser:notify MediaVaultJobComplete
xmlns:ser="http://com/genericstudio/dete/ws/servicing">
    <xsd:JobNotificationResponse jobId="string"
    createdOn="2008-09-28T18:49:45"
modifiedOn="2006-09-18T16:18:33"
xmlns:xsd=
"http://mv.webservices.generic.com/cf/scheduler/2005/11/xsd/">
        <xsd:Template>string</xsd:Template>
        <!--Optional:-->
        <xsd:CorrelationId>string</xsd:CorrelationId>
        <!--Optional:-->
        <xsd:Priority>3</xsd:Priority>
        <!--Optional:-->
        <xsd:Status>Failed</xsd:Status>
        <!--Optional:-->
        <xsd:StatusInfo>string</xsd:StatusInfo>
        <!--You may enter ANY elements at this point-->
        <AnyElement/>
    </xsd:JobNotificationResponse>
</ser:notifyMediaVaultJobComplete>
```

Using the correlation identifier, the watch servicing process message activity 1202 checks to verify that the correlation identifier is indeed available and waiting at that activity. If this is not the case, the watch servicing process message activity 1202 sends a notification explaining the issue along with an exception being thrown. The watch servicing process message activity 1202 passes a status message back to the main servicing flow. If the status message does not have a value of "completed," then an error flag is set to true and also sent.

The DMS notification returns an absolute file path.

TABLE 3

Exemplary Format of a DMS Notification

```
<ser:notifyDMSAssetDownload xmlns:ser=
"http://com/genericstudio/dete/ws/servicing">
    <del:DeliveryMonitorServiceResponse
xmlns:del="http://dete.genericstudio.com/servicing/deliverymonitor">
        <batchID>string</batchID>
        <statusMessage>string</statusMessage>
    </del:DeliveryMonitorServiceResponse>
</ser:notifyDMSAssetDownload>
```

The watch servicing process message activity 1202 verifies the file path against the database. If it passes validation, the correlation identifier associated to that filename is found and the watch servicing process message activity 1202 sends the actual filename to the main flow. If the file path validation failed, then the watch servicing process message activity 1202 sends a notification stating validation failure. However, sometimes the validation may fail given the fact that the file has been downloaded already. If that is the case, the watch servicing process message activity 1202 logs a message, but no notification is sent.

The Cancel digital master Request returns a task identifier.

TABLE 4

Exemplary Format of a Cancel Digital Master Request

```
<ser:cancelEMasterDownload xmlns:ser=
"http://com/genericstudio/dete/ws/servicing">
    <emas:EMasterCancellationRequest
xmlns:emas="http://dete.genericstudio.com/servicing/emaster">
        <deteTaskID>3</deteTaskID>
    </emas:EMasterCancellationRequest>
</ser:cancelEMasterDownload>
```

The watch servicing process message activity 1202 uses the task identifier as the key to query the engine database to find its corresponding correlation identifier. If the correlation identifier is found, the watch servicing process message activity 1202 initiates a cancel request, keeping in mind that it may be too late to cancel the servicing request. If the correlation is not found, the watch servicing process message activity 1202 sends a detailed notification and throws an exception.

The initiate digital master request returns a complex object with all metadata required for a digital master download to successfully complete.

TABLE 5

Exemplary Format of an Initiate Digital Master Request

```
<ser:initiateEMasterDownload xmlns:ser=
"http://com/genericstudio/dete/ws/servicing">
    <emas:EMasterDownloadRequest xmlns:emas="http://dete.
genericstudio.com/servicing/emaster">
        <deteTaskID>3</deteTaskID>
        <assetGID>string</assetGID>
        <memberName>string</memberName>
        <user name>string</user name>
        <outputFormatName>string</outputFormatName>
        <deliveryMechanism>string</deliveryMechanism>
        <allowedState>ALL</allowedState>
        <orderID>string</orderID>
        <transactionID>string</transactionID>
    </emas:EMasterDownloadRequest>
</ser:initiateEMasterDownload>
```

Along with unique identifiers and various member names, the output format name is assumed to be the default digital master download output format name. Each task is assigned an output format. An output format represents the type of servicing work that is requested to get done for that task. A given output format has associated content formatting templates. For example, the output format may be stored as a name (e.g., string type) while the content formatting template may be stored as a document (e.g., XML). The output format is a business parameter, so it may be updated at any time. The watch servicing process message activity 1202 uses all of the metadata to populate a servicing task object. The watch servicing process message activity 1202 then uses this object to kick off a servicing request.

If the watch servicing process message activity 1202 does not recognize the operation associated to the message, the watch servicing process message activity 1202 logs a message with the operation.

The servicing business process flow 1200 includes a schedule media vault jobs activity 1203. The schedule media vault jobs activity 1203 is positioned below and disconnected from the servicing activity pipeline 1201. When the schedule media vault jobs activity 1203 is invoked, the schedule media vault jobs activity 1203 acts as a queuing mechanism for all content processing jobs. The schedule media vault jobs activity 1203 automatically runs on a given interval. The goal of the schedule media vault jobs activity 1203 is to schedule the highest priority job through the Media Vault Scheduler Service.

Figure 12B:
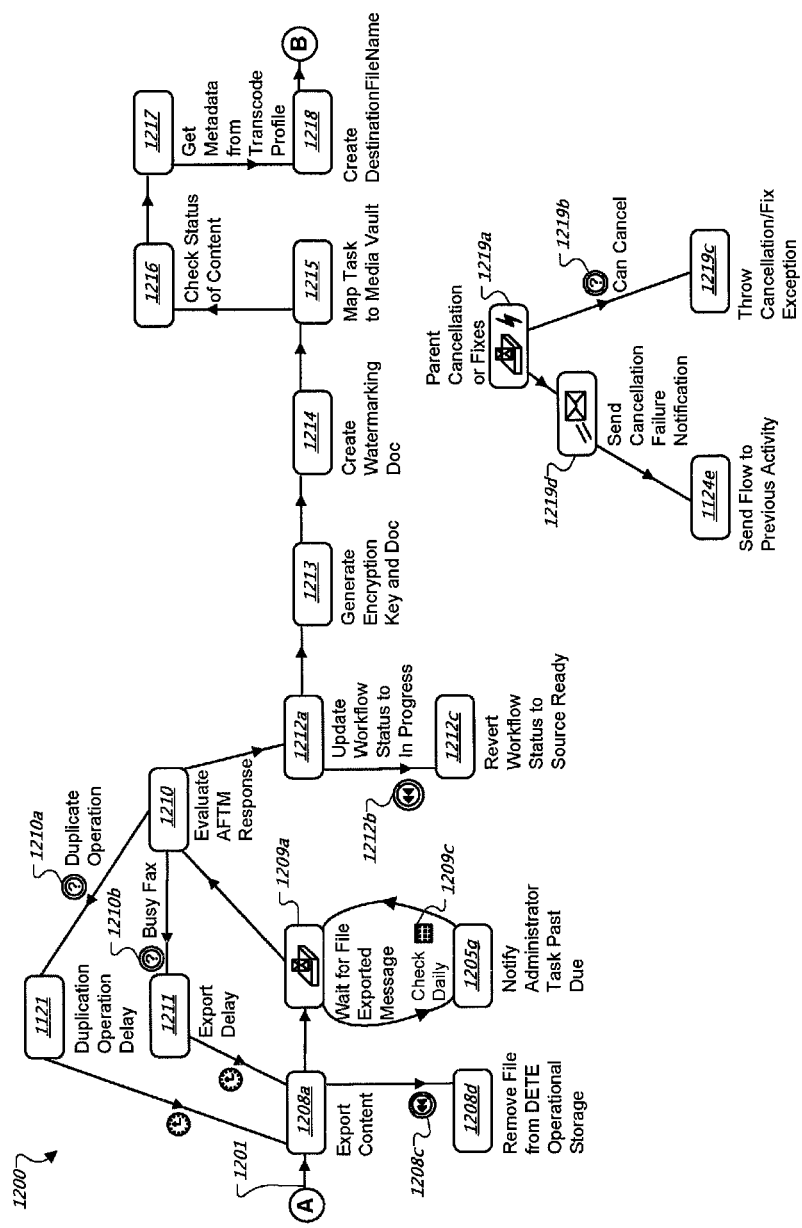
Figure 12C:
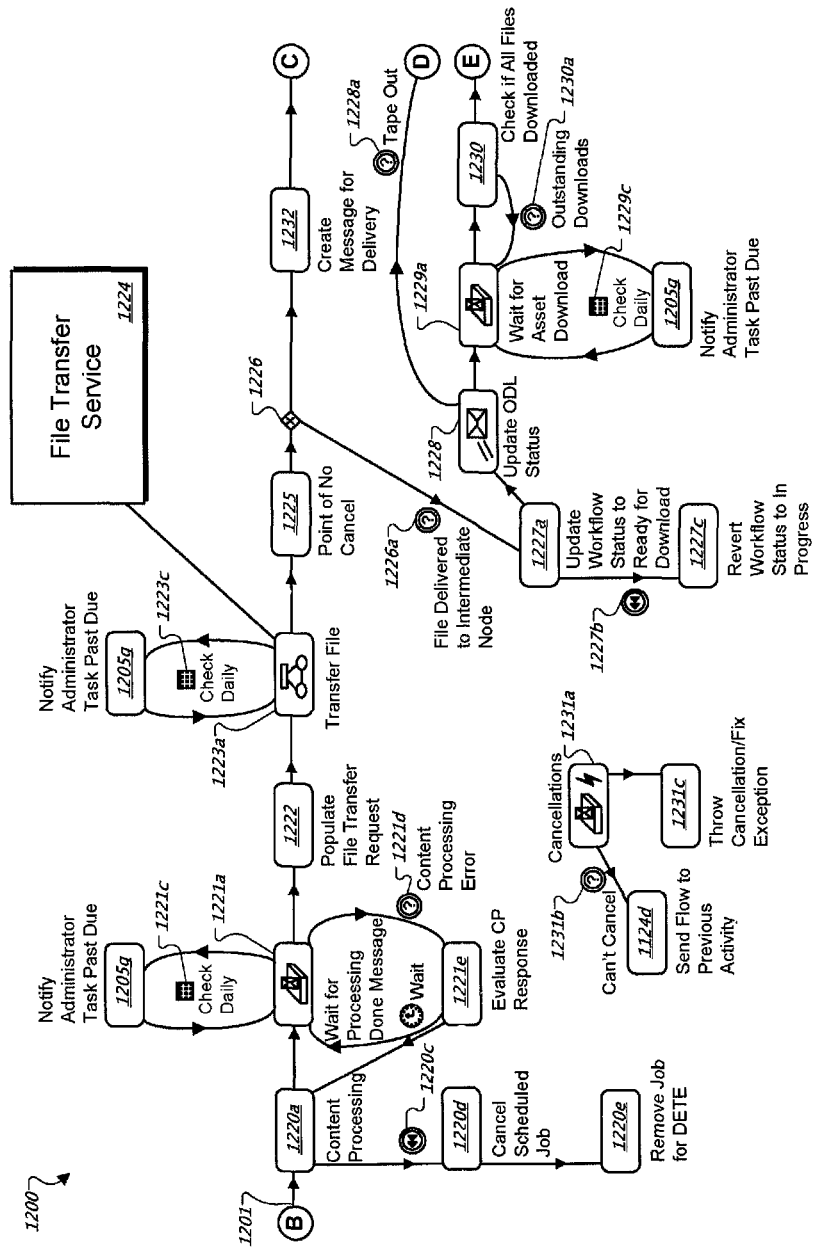

As jobs are added, for example via a content processing sub-activity 1220*a* in the main flow (as shown in FIG. 12C), they are not truly run until the schedule media vault jobs activity 1203 decides which job should to be processed first. First, an external interface service call is made to check if the Media Vault Scheduler Service is active or if there are any other jobs pending. If there are no jobs pending, the schedule media vault jobs activity 1203 makes a query in the application database to pull the earliest due-date job from the table. This job is pulled and its job identifier is sent as the parameter of the schedule job external interface service method. If the job has been scheduled, then the schedule media vault jobs activity 1203 removes the job's entry from the database table.

The servicing activity pipeline begins with a begin activity 1204. The begin activity 1204 of the servicing business process flow 1200 takes a generic task object as its input to complete a servicing request. Several key business variables are set so they may be exposed to the user interface and written to the database. Various values are pulled from the task object and assigned to business variables.

The start order correlation activity 1104 follows the begin activity 1204. The start order correlation activity 1104 creates a unique correlation identifier by taking the current timestamp and appending it to the associated transaction identifier, for example, "ServicingCorrelation" may be used to signify that it is generic enough to be used for the entire process.

The look up metadata from media vault activity 1105*a* follows the start order correlation activity 1104. The set workflow start date activity 1106 follows the look up metadata from media vault activity 1105*a*. An obtain asset status sub-activity 1205*a* follows the set workflow start date activity 1106. The obtain asset status sub-activity 1205*a* queries the digital master metadata of the associated UMID so that the latest state information may be pulled. Every digital asset contains metadata. Each digital asset has a unique UMID as well. The metadata associated to a given asset is pulled using the UMID. Metadata that is pulled from this query may include, but is not limited to, content durations, title name, screen aspect ratio, standard, drop frame, frame rate, format, picture aspect ratio, source picture format, etc. With this information, the servicing business process flow 1200 will know whether to continue with the main flow or to wait until the digital master is ready.

An obtain asset status helper method, accepting a UMID for reading asset information, may be utilized to perform this activity. The obtain asset status helper method pulls the digital master state metadata to see if the value is "in". A master ready 1205c determines the value of the state.

If the state does not have an "in" value, an update workflow status to waiting for source sub-activity 1205d is invoked. The update workflow status to waiting for source sub-activity 1205d sets the business variable "workflow status" to "waiting for master" so that the user interface workflow monitor page may query off that status. The "waiting for master" status means that the digital master is not ready and the servicing business process flow 1200 is waiting for a notification message from the ingestion business process flow 1100 to alert the servicing business process flow 1200 that the file has been ingested. The current instance information is persisted to the database for workflow monitoring purposes.

A wait for master sub-activity 1205e follows the update workflow status to waiting for source sub-activity 1205d. The wait for master sub-activity 1205e waits for a notification to come from the ingestion business process flow 1100. Once a digital master has been ingested into the digital vault, the active instance of the servicing business process flow 1200 that is using that digital master as the source may then be updated to continue processing.

A digital master should be in a state of "in" before an active instance of the servicing business process flow 1200 using that digital master may be processed. Using correlation ids to recognize which instance of the servicing business process flow 1200 is waiting for the source to be "in", the active instance of the ingestion business process flow 1100 calls back to the correct instance of the servicing business process flow 1200.

A wait for master check daily transition 1205f transitions execution to a notify administrator task past due sub-activity 1205g if the instance is still executing the wait for master sub-activity 1205e at time of check. If an order is past due, the notify administrator task past due sub-activity 1205g notification is sent to the requestor along with data to allow the recipient to know which order has been delayed. The notify administrator task past due sub-activity 1205g compares the current time to the due date of the order and if it is delayed, the notification message is constructed with instance data. A helper method may be used for the relevant notification, accepting each variable as a parameter.

Returning to the obtain asset status sub-activity 1205a, if the value of the digital master state metadata is "in", an update workflow status to source ready sub-activity 1205h is invoked. The update workflow status to source ready sub-activity 1205h sets the workflow status business variable to "source ready" to be used in the workflow monitor page. This status allows the user to know that the digital content copies have been exported and content processing may begin. The current instance information is persisted to the database for workflow monitoring purposes.

A get sender info activity 1206 follows the update workflow status to source ready sub-activity 1205h. The get sender info activity 1206 generates sender information based on the information passed into the servicing business process flow 1200. The get sender info activity 1206 determines the sending member name. Given the sending member name and the delivery mechanism, the get sender info activity 1206a determines a sender profile via the database. If the user name was not set as part of the incoming task object into the servicing business process flow 1200, then the get sender info activity 1206a assigns a default user name to the current task. This user name is also a business parameter.

A get recipient info activity 1207 follows the get sender info activity 1206. The get recipient info activity 1207 generates recipient information based on the information passed into the servicing business process flow 1200. Given the deliver-to member name and the delivery mechanism, the get recipient info activity 1207 determines a recipient profile via the database.

As shown in FIG. 12B, an export content sub-activity 1208a follows the get recipient info activity 1207. The export content sub-activity 1208a coordinates with a remove file from DETE operational storage sub-activity 1208d. The export content sub-activity 1208a exports the digital master source that has already been imported into the digital vault in the form of a digital content copy. The digital content copy is transferred to the operational storage using the Asset File Transfer Module. An export content helper method may be utilized to perform the export of the asset. The asset reference, task object information, filenames and specific storage URIs are passed as parameters.

A correlation identifier is also passed to the external interface service to identify which instance should be notified. The timeout for the activity is set for a delay determined by a business parameter. An increased timeout may be desired for this activity since the export might receive a busy fault. By adjusting the business parameter, the number of retries may be set before an exception is thrown.

A rewind 1208c determines whether or not the export content sub-activity should be compensated. If a servicing task should to be compensated and a digital content copy has already been exported to the operational storage, the digital content copy should to be removed from that storage. The remove file from DETE operational storage sub-activity 1208d is called to complete this task. In some implementations, the remove file from DETE operational storage sub-activity 1208d is invoked as a "fire and forget" since during a compensation, exceptions may not be handled. The remove file from DETE operational storage sub-activity 1208d passes the digital content copy source file names into the external interface service method so they may be removed from the storage drive.

A wait for file exported message sub-activity 1209a follows the export content sub-activity 1208a. The wait for file exported message sub-activity 1209a coordinates with the notify administrator task past due sub-activity 1205g. The active instance of the servicing business process flow 1200 will sit indefinitely at the wait for file exported message sub-activity 1209a waiting for a notification from the watch servicing process message activity 1202. If a message intended for a particular instance of the servicing business process flow 1200 is received by the wait for file exported message sub-activity 1209a, the wait for file exported message sub-activity 1209a will transition to the next activity (e.g., an evaluate Asset File Transfer Module response activity 1210). The wait for file exported message sub-activity 1209a accepts the export response object for further processing.

If the active instance of the servicing business process flow 1200 is still at the wait for file exported message sub-activity 1209a, A wait for file exported message check daily transition 1209c will transition to the notify administrator task past due sub-activity 1205g.

The evaluate Asset File Transfer Module response activity 1210 follows the wait for file exported message sub-activity 1209a. The evaluate Asset File Transfer Module response activity 1210 evaluates the export response to determine if any action is desired. The job status, fault code and status message are parsed from the response object. If the job status indicates failure then the fault code is further analyzed to determine what type of failure occurred. If a busy fault or duplicate operation fault occurs, the evaluate Asset File Transfer Module response activity 1210 sets a flag indicating that a delay should occur before an import request may be called again. If a different type of fault occurred, the evaluate Asset File Transfer Module response activity 1210 throws an exception along with key information to be sent in the email to the administrator.

If the duplicate operation flag is set, a evaluate Asset File Transfer Module response duplicate operation transition 1210*a* is followed, transitioning to the duplication operation delay activity 1121. If the duplicate operation flag is set, a evaluate Asset File Transfer Module response busy fax transition 1210*b* is followed, transitioning to an export delay activity 1211. If the initial export request responded with a busy fault, a delay may be desired before re-invoking the subsequent request. The export delay activity 1211 sets up the due transition using the delay determined by the business parameter. After the specified amount of time set by either the duplication operation delay activity 1121 or the export delay activity 1211, the active instance of the servicing business process flow 1200 transitions to the export content sub-activity 1208*a*.

Returning to the evaluate Asset File Transfer Module response activity 1210, the active instance of the servicing business process flow 1200 transitions to an update workflow status to in progress sub-activity 1212*a*. The update workflow status to in progress sub-activity 1212*a* coordinates with a revert workflow status to source ready sub-activity 1212*c*. The update workflow status to in progress sub-activity 1212*a* sets the business variable "workflow status" to "in progress" so that the user interface workflow monitor page may query off that status. This status allows the user to know that content processing or file transfer is in progress. The current information regarding the active instance of the servicing business process flow 1200 is persisted to the database for workflow monitoring purposes.

If an update workflow status to in progress compensation 1212*b* is desired, the revert workflow status to source ready sub-activity 1212*c* is invoked. The revert workflow status to source ready sub-activity 1212*c* sets the workflow status business variable to "source ready" to be used in the workflow monitor page. This status allows the user to know that the digital content copy or copies have been exported and that content processing may begin. The revert workflow status to source ready sub-activity 1212*c* persists information regarding the active instance of the servicing business process flow 1200 to the database for workflow monitoring purposes.

A generate encryption key and doc activity 1213 follows the update workflow status to in progress sub-activity 1212*a*. If required by the end recipient, the generate encryption key and doc activity 1213 generates an encryption key and saves the key to the database for archiving purposes. Given the deliver-to member name, the generate encryption key and doc activity 1213 may query the member profile in the database. Looking at the profile, the generate encryption key and doc activity 1213 may determine if the end recipient requires encryption. If encryption is required, then the generate encryption key and doc activity 1213 generates a unique identifier and inserts an entry of its existence into the proper table of the database. Also, for content processing to encrypt the output files, the generate encryption key and doc activity 1213 may place the encryption key into a custom xml document which may then be added to the media vault job request.

A create watermarking doc activity 1214 follows the generate encryption key and doc activity 1213. As part of the incoming task object, watermarking may be indicated as a requirement. If that is the case, the create watermarking doe activity 1214 retrieves the watermarking payload based on the prepared-for member name and adds the watermarking task to the content processing request. In some implementations, watermarking is known to the active instance of the servicing business process flow 1200 at the order level. If watermarking is desired, for example, then given the prepared-for member name, the create watermarking doc activity 1214 may query to pull the watermarking payload from the member's profile. Once the payload is available, the create watermarking doe activity 1214 places the information inside another custom xml document which may then be added to the media vault job request.

A map task to media vault activity 1215 follows the create watermarking doe activity 1214. In order for content processing to occur, the workflow name, content formatting template, and transcode profile should be determined. The transcode profile, as used herein, refers to a document (e.g., XML) that outlines a set of specific instructions that are to occur during the present task. All order tasks are associated with a specific workflow type. If the task is not associated with any of the available workflow types, then the order may not proceed further. The given values are housed in both the DETE database as well as the business process database system catalog of the project. A workflow name, as used herein, is the name of a given workflow type.

The map task to media vault activity 1215 generates this information which will be used later as part of the media vault job request to content processing. The output format name is part of the task object that is passed into the active instance of the servicing business process flow 1200. With the output format name, the transcode profile and content formatting template may be queried and retrieved via the database. Once these profiles are pulled, for example, the XML documents that they reference may be pulled and stored locally for later processing. The workflow name may be determined by the output format name, the encryption flag, and the watermarking flag.

A check status of content activity 1216 follows the map task to media vault activity 1215. Before the output format, workflow, content formatting template, and transcode profile may be used, the check status of content activity 1216 checks to verify that these profiles are all active. If they are all active, then the active instance of the servicing business process flow 1200 may proceed on the main flow. If not, in some implementations, the process may stop and an action may ensue (e.g., an order canceling action, an activation of the given profiles action, etc.).

A get metadata from transcode profile activity 1217 follows the check status of content activity 1216. The get metadata from transcode profile activity 1217 determines specific digital content copy information so that this metadata may be used later for file naming and notification purposes. In some implementations, bit rate and resolution, specific metadata related to the digital content copy, are stored in the database (e.g., in the output format table). Given the output format name, the bit rate and resolution may be pulled. Once the bit rate and resolution are available to the business layer, the resolution information maybe used as part of file naming. Bit rate may be included as part of some notifications.

Each profile in their respective tables has an "active" column. If the active column of the used profiles is not set to "yes", then the active instance of the servicing business process flow 1200 may not proceed as normal. The get metadata from transcode profile activity 1217 throws an exception, causing the administrator to take action (e.g., cancel the order or activate the given profiles).

A create DESTINATIONFILENAME activity 1218 follows the get metadata from transcode profile activity 1217. Each recipient may desire different naming conventions for files (e.g., digital content copies). Using metadata that is common to them, for example, the create DESTINATIONFILENAME activity 1218 concatenates a filename and uses the filename as the destination filename. Given the delivered-to member name, the file naming convention for that recipient may be determined. Once determined, the create DESTINATIONFILENAME activity 1218 checks the sunset date, which is the date when the asset may not require watermarking (e.g., may already be on the market). For example, if the asset represents a movie, the sunset date may represent the date the movie was released on DVD.

If the sunset date it has not passed, the create DESTINATIONFILENAME activity 1218 may use a security name for the title of the file. Next, the create DESTINATIONFILENAME activity 1218 creates a file name based on the naming tags available. If no naming convention is chosen by the recipient, then the task identifier may be the default name of the file. The create DESTINATIONFILENAME activity 1218 then encodes the file.

A parent cancellation or fixes sub-activity 1219a is positioned below and separate from the servicing activity pipeline 1201. The parent cancellation or fixes sub-activity 1219a coordinates with a throw cancellation/fix exception sub-activity 1219c, a send cancellation failure notification sub-activity 1219d, and the send flow to previous activity sub-activity 1124e.

A notification interrupt allows messages to be received outside of the main flow, effectively interrupting whatever the instance was working on. The parent cancellation or fixes sub-activity 1219a receives messages from the parent process (e.g. asset management servicing) or another process. A cancellation or fix order may have reached the parent process, at which point the active instance of the servicing business process flow 1200 should be notified to stop processing. The parent cancellation or fixes sub-activity 1219a is set up with an input argument to accept correlations. Allow interruptions and process immediately is configured since a cancellation may come at any point in the process.

If a parent cancellation or fixes transition 1219b determines that the active instance of the servicing business process flow 1200 can't be canceled because the cancellation request has come in after a point in the process where it may not be cancelled, then active instance of the servicing business process flow 1200 is returned to the last activity (before interruption) by transitioning to the send cancellation failure notification sub-activity 1219d. The send cancellation failure notification sub-activity 1219d sends a message to the parent process (e.g., asset management servicing) to create and send out a notification. This notification will let the MPO creator know that the servicing request could not be cancelled. In some implementations, an internal business project management database system method may be used to send a message to the parent process of the active instance of the servicing business process flow 1200. The send cancellation failure notification sub-activity 1219d sends relevant data associated to the active instance as arguments so that when the notification is created, the MPO creator will know which servicing request could not be cancelled.

If the parent cancellation or fixes transition 1219b determines that the active instance of the servicing business process flow 1200 may be canceled, the active instance of the servicing business process flow 1200 transitions to the throw cancellation/fix exception sub-activity 1219c. The throw cancellation/fix exception sub-activity 1219c throws a custom cancellation so that the cancellation flow may be executed. For example, the throw cancellation/fix exception sub-activity 1219c may throw a custom exception so that the process level exception handling may catch it to start executing the cancellation flow (outside the realm of this specification).

Returning to the servicing activity pipeline 1201, as shown in FIG. 12C, the content processing sub-activity 1220a follows the create DESTINATIONFILENAME activity 1218. The content processing sub-activity 1220a coordinates with a cancel scheduled job sub-activity 1220d and a remove job for DETE sub-activity 1220e. The content processing sub-activity 1220a takes a generic digital copy of a digital master and processes it in compliance with what the end recipient requires. The content processing job request, in some implementations, may consist of seven to eight major pieces of data. The first two are the source filenames. The source names may be used to export the digital copies. The workflow name may determine the type of workflow. The transcode profile is the same profile that was pulled from the database. The content formatting template goes through an input aggregator which also takes in the asset UMID and performs more validations. For example, the input aggregator may validate the source against the output being requested and generate transformation instructions to be passed into the scheduler. Once the validations pass, a unique content formatting profile emerges. This profile is another input into the job request. The next two arguments are the encryption and watermarking documents. These may be optional (e.g., depending on whether they are being used or not). Finally, the destination filename(s) are the last arguments that complete the job request.

Once the content processing sub-activity 1220a has added the job, the content processing sub-activity 1220a makes a new entry in the database for the job. Based on the due-date metadata (e.g., sent as part of the servicing task object), the most pressing job may be processed (scheduled) first.

If a job has been added/scheduled to the schedule media vault job activity 1203, but a content processing compensation 1220c determines that a compensation is desire schedule media vault job activity 1203d, the cancel scheduled job sub-activity 1220d is invoked. The cancel scheduled job sub-activity 1220d may be invoked as a "fire and forget", because, during a compensation, exceptions may not be handled. The cancel scheduled job sub-activity 1220d passes the media vault job identifier for the servicing task to the cancel scheduled job external interface service method so that the job may be cancelled.

The remove job for DETE sub-activity 1220e follows the cancel scheduled job sub-activity 1220d. If a job has been added/scheduled to the schedule media vault job activity 1203 but is being compensated, the respective job entry should be removed from the DETE database. There is a chance that the entry no longer exists in the database. If the entry no longer exists, the remove job for DETE sub-activity 1220e is skipped. The remove job for DETE sub-activity 1220e uses the media vault job identifier for the servicing task as the key to query the database table for the entry. If the entry is found, the remove job for DETE sub-activity 1220e removes that row of data from the database table (e.g., using key word value BADJ_MV_JOBS).

A wait for processing done message sub-activity 1221a follows the content processing sub-activity 1220a. The wait for processing done message sub-activity 1221a coordinates with the notify administrator task past due sub-activity 1205g and an evaluate content processing (CP) response sub-activity 1221e. The active instance of the servicing business process flow 1200 may sit indefinitely at the wait for processing done message sub-activity 1221a waiting for a notification from the watch servicing process message activity 1202. If a message intended for a particular instance is received by the wait for processing done message sub-activity 1221a, the wait for processing done message sub-activity 1221a will transition to the next activity (e.g., a populate file transfer request activity 1222). The wait for processing done message sub-activity 1221a accepts the content processing response message for further processing.

If a wait for processing done message check daily transition 1221c finds that the active instance of the servicing business process flow 1200 is still at the wait for processing done message sub-activity 1221a, the active instance transitions to the notify administrator task past due sub-activity 1205g.

If the wait for processing done message sub-activity 1221a receives a content processing response message with an error value, then a content processing error transition 1221d transitions the active process to the evaluate CP response sub-activity 1221e. The evaluate CP response sub-activity 1221e evaluates the content processing response message further to determine what action is desired. If for example, the job status message has a value of "running," "submitted," or "pending", then the process may be returned to the wait for processing done message sub-activity 1221a. The evaluate CP response sub-activity 1221e sends out a notification to the administrator assuring the administrator of this response. If any status besides "completed" is received, the evaluate CP response sub-activity 1221e throws an exception with detailed notification.

The populate file transfer request activity 1222 follows the wait for processing done message sub-activity 1221a. Before calling the file transfer subprocess (e.g., part of a file transfer service 1224), the populate file transfer request activity 1222 fills out the file transfer input argument with the relevant information to be able to successfully transfer a file. Information is aggregated from the task object to accomplish this. In some implementations, the destination file names are based off the file naming convention specific for each end recipient.

The source filenames are named using the task identifier for the servicing process. This may be done to so that the source file names are unique, given that they represent a unique digital content copy and not a digital master asset. The populate file transfer request activity 1222 generates the recipient and sender profiles along with the user name (if not given, initially). All other information desired for the file transfer request object may be taken from the task object that was passed into the active instance of the servicing business process flow 1200 from its parent.

A transfer file sub-activity 1223a follows the populate file transfer request activity 1222. The transfer file sub-activity 1223a coordinates with the notify administrator task past due sub-activity 1205g. The transfer file sub-activity 1223a transfers files from the source to the destination according to the file transfer request object. The transfer file sub-activity 1223a sends the source file from the node associated with the source delivery profile to the destination associated with the destination delivery profile using the transfer mechanism specified in the request object. For example, the transfer file sub-activity 1223a may use the file transfer service 1224 to transfer one or more files.

If a transfer file check daily transition 1223c finds that the active instance of the servicing business process flow 1200 is still at the transfer file sub-activity 1223a, the active instance transitions to the notify administrator task past due sub-activity 1205g.

A point of no cancel activity 1225 follows the transfer file sub-activity 1223a. Once the active instance of the servicing business process flow 1200 has reached this stage, any requests to cancel or fix may not be accepted. Thus, the point of no cancel activity 1225 activity marks a flag so that cancellations may not proceed. In some implementations, the point of no cancel activity 1225 sets a "cannot cancel" Boolean flag to true.

A point of no cancel decision marker 1226 determines whether or not files are delivered to an intermediate node. If files are "staged" (e.g., placed on a server outside of the vault where the files may be pushed or pulled to a destination) or sent to the external file transfer node, a file delivered to intermediate node transition 1226a transitions the active instance to an update workflow status to ready for download sub-activity 1227a. The update workflow status to ready for download sub-activity 1227a coordinates with a revert workflow status to in progress sub-activity 1227c. The update workflow status to ready for download sub-activity 1227a sets the workflow status business variable to "ready for download" to be used in the workflow monitor page.

The "ready for download" status means that the file is sitting on an intermediate node and the end recipient may start downloading the asset. The update workflow status to ready for download sub-activity 1227a persists information regarding the active instance of the servicing business process flow 1200 to the database for workflow monitoring purposes. In order to monitor the number of files which are part of a servicing task and how many files are going to be downloaded, the update workflow status to ready for download sub-activity 1227a may set one or more counters. If an update workflow status to ready for download compensation 1227b is desired, the active instance transitions to the revert workflow status to in progress sub-activity 1227c.

The revert workflow status to in progress sub-activity 1227c sets the workflow status business variable to "in progress" to be used in the workflow monitor page. This status allows the user to see that content processing or file transfer is in progress. The current instance information is persisted to the database for workflow monitoring purposes.

An update ODL status activity 1228 follows the update workflow status to ready for download sub-activity 1227a. The update ODL status activity 1228 sends a process notification message to the parent process (e.g., asset management servicing) to let the parent process know that the files have been "staged." The notification message may be sent in an asynchronous matter so the active instance of the servicing business process flow 1200 does not wait for the parent to callback. Rather, the active instance continues processing. A business object is passed in as a parameter so that the parent has adequate information to proceed with its requirements.

Figure 12D:
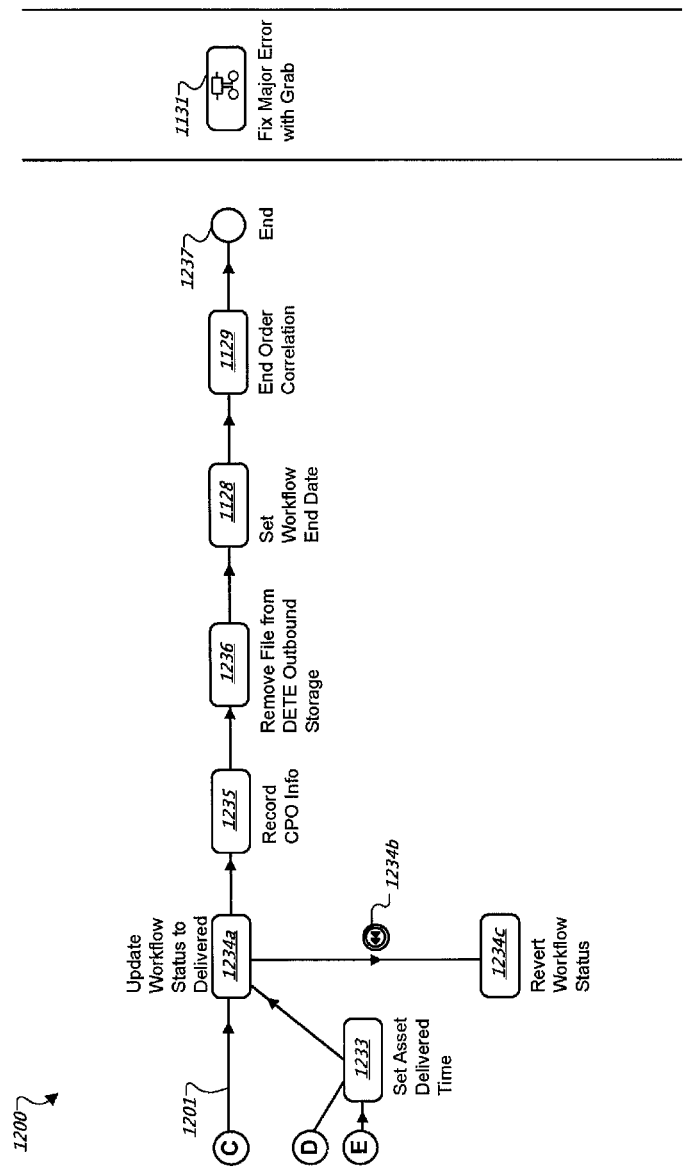

If an update ODL status tape out transition 1228a determines that the workflow type is "tape out", the asset can be scheduled to be transferred to a physical media (e.g., tape) and shipped. In this circumstance, the asset is not electronically delivered. The update ODL status tape out transition 1228a transitions the active instance to a set asset delivered time activity 1233 (as shown in FIG. 12D).

A wait for asset download sub-activity 1229a follows the update ODL status activity 1228. The wait for asset download sub-activity 1229a coordinates with the notify administrator task past due sub-activity 1205g. For servicing tasks that are "staged" and are not tape out workflows, the wait for asset download sub-activity 1229a waits for all files that are part of that request to be downloaded. Once downloaded, the active instance may continue on and close the order Using the watch servicing process message activity 1202, the wait for asset download sub-activity 1229*a* processes a message from the Delivery Monitor Service (DMS). If the file in the DMS request is part of any open servicing tasks and the absolute path of the request file matches with that of one of these open tasks, then a match is found. The wait for asset download sub-activity 1229*a* records that the file has been downloaded and waits for all the files that are part of that request to download. If all files are downloaded, the active instance of the servicing business process flow 1200 proceeds.

If a wait for asset download check daily transition 1229*c* determines that the active instance is still at the wait for asset download sub-activity 1229*a*, the wait for asset download check daily transition 1229*c* transitions the active instance of the servicing business process flow 1200 to the notify administrator task past due sub-activity 1205*g*.

A check if all files downloaded activity 1230 follows the wait for asset download sub-activity 1229*a*. There maybe multiple files as part of the servicing task that was "staged." The check if all files downloaded activity 1230 checks to see if all files for a particular task have been downloaded. Once the DMS request comes in and a match has been made, the filename is passed into the check if all files downloaded activity 1230. The check if all files downloaded activity 1230 checks that this file has already been downloaded and if it is the last file to be downloaded, the check if all files downloaded activity 1230 will proceed (e.g., to the set asset delivered time activity 1233 as shown in FIG. 12D).

If the file has not been downloaded, the check if all files downloaded activity 1230 will transition the active instance to the wait for asset download sub-activity 1229*a* where the active instance waits for another DMS request to come in. A set asset delivered time outstanding downloads transition 1230*a* determines if there are still one or more outstanding files left to be downloaded as part of the servicing task.

Returning to the point of no cancel decision marker 1226, if the servicing task is not "staged", the active instance transitions to a create message for delivery activity 1232. The create message for delivery activity 1232 prepares a notification for the end recipient to alert the recipient that the digital master download is complete. A helper method may be utilized to send the proper notification. Relevant data associated to the active instance is sent as arguments so that the recipient knows which digital master download request has completed. Upon completion of the create message for delivery activity 1232, the active instance transitions to an update workflow status to delivered sub-activity 1234*a* (as shown in FIG. 12D).

A cancellations sub-activity 1231*a* is positioned beneath and detached from the servicing activity pipeline 1201. The cancellations sub-activity 1231*a* coordinates with the send flow to previous activity sub-activity 1124*d* and a throw cancellation/fix exception activity 1231*c*. A notification interrupt allows messages to be received outside of the main flow of the active instance of the servicing business process flow 1200, effectively interrupting whatever the active instance was working on. The cancellations sub-activity 1231*a* receives messages from an external method (e.g., the user interface). A cancellation request may have originated from the user interface, at which point the request came to notify the active instance of the servicing business process flow 1200 to stop processing. The cancellations sub-activity 1231*a* may be set up, in some implementations, with an input argument to accept correlations. Allow interruptions and process immediately may be configured since a cancellation may come at any point in the process.

If a cancellations transition 1231*b* determines that the process may not be canceled, for example because the cancellation request has come in after a point in the active instance of the servicing business process flow 1200 where it may not be cancelled (e.g., at the point of no cancel activity 1225, etc.), then the cancellations transition 1231*b* transitions the active instance to the send flow to previous activity sub-activity 1124*d* where the active instance is returned to the last activity (e.g., before interruption).

If the cancellations transition 1231*b* determines that the process may be canceled, the active instance transitions to the throw cancellation/fix exception sub-activity 1231*c*. The throw cancellation/fix exception sub-activity 1231*c* throws a custom cancellation so that the cancellation flow may be executed. In some implementations, the throw cancellation/fix exception sub-activity 1231*c* throws a custom exception so that the process level exception handling may catch it to start executing the cancellation flow.

Returning to the servicing activity pipeline 1201, as shown in FIG. 12D, the set asset delivered time activity 1233 follows the update ODL status activity 1228 or the check if all files downloaded activity 1230. Once the asset has been downloaded and the files are delivered, the set asset delivered time activity 1233 sets the asset delivered time. The delivered time, for example, may be an achievable piece of data. The current system time may be set with the business process management database system key word "now".

The update workflow status to delivered sub-activity 1234*a* follows the set asset delivered time activity 1233 or the create message for delivery activity 1232. The update workflow status to delivered sub-activity 1234*a* coordinates with a revert workflow status sub-activity 1234*c*. The update workflow status to delivered sub-activity 1234*a* sets the workflow status business variable to "delivered" to be used in the workflow monitor page. The "delivered" status means that the file has been delivered to the end recipient and that DETE is no longer responsible for the file. The update workflow status to delivered sub-activity 1234*a* persists information regarding the active instance of the servicing business process flow 1200 to the database for workflow monitoring purposes.

If an update workflow status to delivered compensation 1234*b* is desired, the active instance transitions to the revert workflow status sub-activity 1234*c*. The revert workflow status sub-activity 1234*c* sets the workflow status business variable back to its original value from the "error" state. The revert workflow status sub-activity 1234*c* persists information regarding the active instance of the servicing business process flow 1200 to the database for workflow monitoring purposes.

A record content processing operations (CPO) info activity 1235 follows the update workflow status to delivered sub-activity 1234*a*. Unique content processing operations occur for every digital content copy that is serviced. The record CPO info activity 1235 records those operations for archiving purposes. A record CPO info helper function may be used, for example, to pull all the operations that were performed on the instance's digital content copy. The operations may be found via the media vault job identifier which is passed to the record CPO info helper function. Once this information is received, the record CPO info helper function concatenates the information into a single string and enters the information into the proper table in the DETE database.

A remove file from DETE outbound storage activity 1236 follows the record CPO info activity 1235. If a servicing task is going to be compensated and a digital content copy has already been exported to the operational storage, the digital content copy should to be removed from that storage. The remove file from DETE outbound storage activity 1236 is called to complete this task. The remove file from DETE outbound storage activity 1236 may be invoked as a "fire and forget" since during a compensation, exceptions may not be handled. The remove file from DETE outbound storage activity 1236 passes the digital content copy source file names into the external interface service method so they may be removed from the storage drive.

The set workflow end date activity 1128 follows the remove file from DETE outbound storage activity 1236. The end order correlation activity 1129 follows the set workflow end date activity 1128. An end activity 1237 follows the end order correlation activity 1129. The end activity 1237 ends the active instance of the servicing business process flow 1200. The end activity 1237 passes a key business object back to the parent (e.g., Asset Management Servicing) so that the parent may complete its requirements.

Figure 12E:
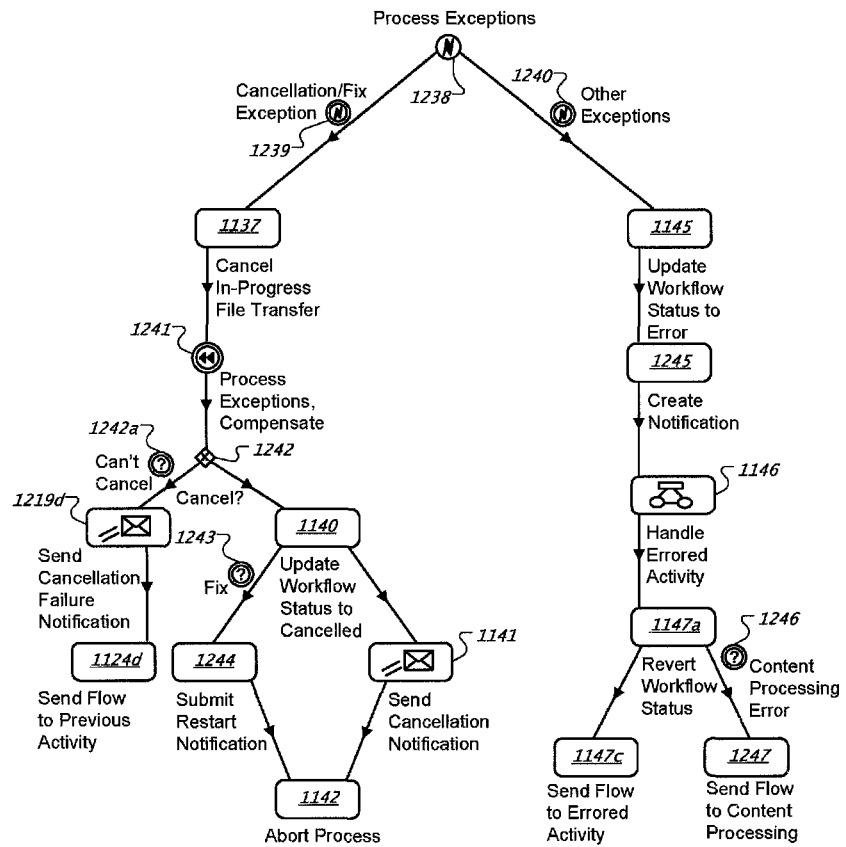

As shown in FIG. 12E, a process exceptions sub-flow 1238 processes both cancellation/fix exceptions via a cancellation/fix exception branch 1239 and other exceptions via an other exceptions branch 1240. The process exceptions sub-flow 1238, for example, may be invoked by the exception queue monitor.

Following the path of the cancellation/fix exception branch 1239, the active instance of the servicing business process flow transitions to the cancel in-progress file transfer 1137. A process exceptions/compensate compensation 1241 follows the cancel in-progress file transfer 1137. The process exceptions/compensate compensation 1241 will execute all the compensation activities associated with activities that have already been executed. During a cancellation, any activities that have executed should effectively be undone. Any activities that perform reads may thus be ignored. In some implementations, the business process management database system provides a compensate capability while keeping track in the back end what has already been run.

A servicing cancellation activity decision marker 1242 follows the process exceptions/compensate compensation 1241. The servicing cancellation activity decision marker 1242 determines whether or not the active instance of the servicing business process flow 1200 may be canceled.

If a cancel transition 1242a determines that the active instance of the servicing business process flow 1200 may not be canceled, the active instance of the servicing business process flow 1200 transitions to the send cancellation failure notification sub-activity 1219d. The send flow to previous activity sub-activity 1124d follows the send cancellation failure notification sub-activity 1219d.

If the cancel transition 1242a determines that the active instance of the servicing business process flow 1200 may be canceled, the active instance of the servicing business process flow 1200 transitions to the update workflow status to cancelled activity 1140. An update workflow status to canceled fix transition 1243 determines whether or not the canceled workflow may be restarted.

If the update workflow status to canceled fix transition 1243 determines that the workflow cancellation may be fixed, the active instance of the servicing business process flow 1200 transitions to a submit restart notification activity 1244. The submit restart notification activity 1244 prepares a notification for the MPO creator to alert the creator that the servicing request has been temporarily stopped. A helper method may be utilized to send the proper notification. Relevant data associated to the active instance of the servicing business process flow 1200 is sent as arguments so that the MPO creator knows which servicing request was stopped.

The abort process activity 1142 follows the submit restart notification activity 1244. If the update workflow status to canceled fix transition 1243 determines that the workflow cancellation may not be fixed, the send cancellation notification activity 1141 is invoked. The abort process 1142 follows the send cancellation notification activity 1141.

Returning to the process exceptions flow 1238, following the path of the other exceptions branch 1240, the update workflow status to error activity 1145 is invoked. A create notification activity 1245 follows the update workflow status to error activity 1145. The create notification activity 1245 prepares a notification for the administrator, alerting the administrator of the various exceptions that have been thrown. A helper method may be utilized to send the proper notification. Relevant data associated to the active instance of the servicing business project is sent as arguments so that the administrator knows which file transfer request errored out.

The 'handle error activity' activity 1146 follows the create notification activity 1245. The revert workflow status sub-activity 1147a follows the 'handle error activity' activity 1146. The revert workflow status sub-activity 1147a coordinates with the send flow to errored activity sub-activity 1147c and a send flow to content processing activity 1247.

If a content processing error has occurred, a content processing error transition 1246 transitions the active instance of the servicing business process flow 1200 to the send flow to content processing sub-activity 1247. The send flow to content processing sub-activity 1247 sends the active instance of the servicing business process flow 1200 back to the activity from which it was interrupted so that the activity may retry the errored step. The key word ACTION, for example, may be used to direct the flow of the active instance in business process management database system. In this case the key word value of SKIP may be used to send the active instance to the part of the main flow after which it was interrupted.

If an error other than a content processing error has occurred, the content processing error transition 1246 transitions the active instance to the send flow to errored activity sub-activity 1147c.

Figure 13:
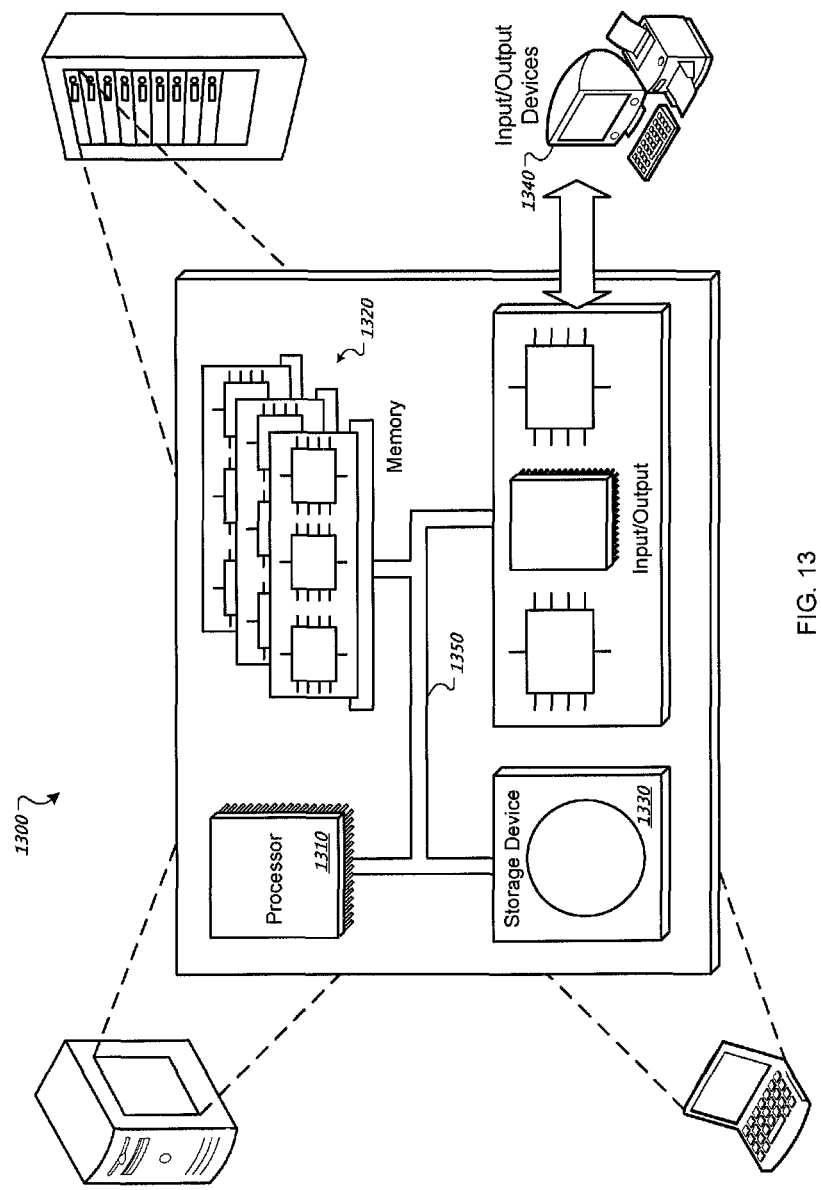
FIG. 13 is a schematic diagram of an example of an exemplary computer system.

FIG. 13 is a schematic diagram of an example of an exemplary computer system 1300. The system 1300 may be used for the operations described in association with the method 300 according to one implementation. For example, the system 1300 may be included in any or all of the studio 112, the first vendor 304, the second vendor 306, the third vendor 308, the airline 310, and the airline 312 as shown in FIG. 3.

The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard and/or pointing device. In another implementation, the input/output device 1340 includes a display unit for displaying graphical user interfaces.

The features described may be implemented in digital electronic circuitry, or in computer hardware, firmware, software, or in combinations of them. The apparatus may be implemented in a computer program product tangibly embodied in an information carrier, e.g., in a machine-readable storage device for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the scope of the disclosure. Accordingly, other implementations are within the scope of the following claims.

What is claimed is:

1. A computer-implemented method comprising:
   receiving data for modeling a digital content distribution process, the data specifying a recipient-defined grouping of processing activities, and one or more recipient-defined exception handling activities that run asynchronously from the processing activities;
   dynamically modeling a digital content distribution process based on the recipient-defined grouping of processing activities, and the one or more recipient-defined exception handling activities that run asynchronously from the processing activities;
   invoking, using one or more processors, the digital content distribution process, comprising:
     ingesting digital content, further comprising storing a digital master of the digital content in a digital vault, and
     servicing a digital copy of the stored digital master based on a servicing request; and
   providing the serviced digital copy to the recipient.

2. The method of claim 1, wherein ingesting the digital content further comprises:
   monitoring a message queue for a message generated by a user interface to begin ingesting the content;
   instantiating an ingestion instance;
   parsing the message into a response object, the response object comprising a correlation identifier identifying the instantiated ingestion instance;
   providing the response object to the user interface.

3. The method of claim 2, wherein the message identifies an import operation or an upload operation.

4. The method of claim 2, further comprising:
   appending a current timestamp with a transaction identifier associated with an ingestion request to ingest the content; and
   generating the correlation identifier based on the appended current timestamp and transaction identifier.

5. The method of claim 1, wherein invoking the digital content distribution process further comprises:
   receiving a task object;
   exposing key variables to a user interface based on the received task object; and
   storing the key variables in a database.

6. The method of claim 1, wherein invoking the digital content distribution process further comprises:
iteratively storing, to a database, instance information upon finishing invoking each sub-activity of the dynamically modeled digital content distribution process;
detecting an exception while executing a sub-activity;
re-executing the sub-activity using the iteratively stored instance information.

7. The method of claim 1, wherein invoking the digital content distribution process further comprises:
querying a database for metadata associated with the digital master; and
exposing key variables to a user interface based on the metadata.

8. The method of claim 7, wherein invoking the digital content distribution process further comprises:
uploading an XML file encoded with the metadata using the user interface; and
mapping the file to an ingestion instance or a servicing instance.

9. The method of claim 1, wherein invoking the digital content distribution process further comprises:
exposing key variables to the user interface, further comprising:
exposing a determined first current system time as a start time key variable, and an end time set to null as an end time key variable,
exposing a "waiting for upload" status as a workflow status key variable based on determining that an ingestion task is pending,
exposing an "uploading" status as the workflow status key variable based on determining that an uploading task is pending,
exposing an "ingesting" status as the workflow status key variable based on determining that an ingestion task is occurring,
exposing an "in" status as the workflow status key variable and a determined second current system time as the end time key variable, based on determining that an ingestion task is completed,
exposing a "cancelled" status as the workflow status key variable based on determining that an ingestion instance is in a cancelled state,
exposing an "error" status as the workflow status key variable based on determining that the ingestion instance is in an error state,
exposing a "waiting for master" status as the workflow status key variable based on determining that the digital master is being ingested,
exposing a "source ready" status as the workflow status key variable based on determining that the digital copy is ready for servicing, and
exposing an "in progress" status as the workflow status key variable based on determining that digital copy is being exported from the digital vault.

10. The method of claim 1, wherein ingesting the digital content further comprises:
receiving an interrupt message identifying an interactive activity;
interrupting the ingesting of the digital content based on the received interrupt message; and
invoking the interactive activity based on interrupting the ingesting.

11. The method of claim 10, further comprising:
resuming ingesting of the digital content based on completing the invocation of the interactive activity.

12. The method of claim 1, wherein ingesting the digital content further comprises:
extracting information from a task object, and from metadata associated with the digital master; and
populating a file transfer request using the information.

13. The method of claim 12, wherein:
extracting the information further comprises:
extracting a file name from the metadata, and
extracting a source delivery profile and a destination delivery profile from the task object; and
populating the file transfer request further comprises:
assigning the file name, the source delivery profile, and the destination delivery profile to a request object.

14. The method of claim 13, wherein ingesting the digital content further comprises:
transferring the digital master from a node associated with the source delivery profile to an inbound storage destination associated with the destination delivery profile.

15. The method of claim 14, wherein storing the digital master in the digital vault further comprises:
transferring the digital master from the inbound storage destination to the digital vault.

16. The method of claim 1, wherein ingesting the digital content further comprises:
deleting a digital master stored in the digital vault.

17. The method of claim 1, wherein ingesting the digital content further comprises:
determining, from metadata associated with the digital master, a location within the digital vault to store the digital master.

18. The method of claim 1, wherein ingesting the digital content further comprises:
determining that an ingestion task is occurring;
exposing key variables to the user interface based on determining that the ingestion task is pending, further comprising:
exposing an ingesting status as a workflow status key variable;
setting a flag to signify that the ingestion task is occurring; and
rejecting an interruption request received while the flag is set.

19. The method of claim 1, wherein:
the servicing request is received prior to completion of the ingesting, and
ingesting the digital content further comprises:
notifying a service process identified in the servicing request based on determining that the ingesting of the digital content is complete.

20. The method of claim 1, wherein:
ingesting the digital content further comprises encoding a physical master of the content into the digital master.

21. The method of claim 1, further comprising receiving a request to service the digital master from a recipient.

22. The method of claim 1, further comprising:
detecting an exception during the invoking of the digital content distribution process; and
propagating the exception to one or more of the one or more recipient-defined exception handling activities.

23. The method of claim 22, wherein propagating the exception further comprises:
determining, initiated by the one or more of the one or more recipient-defined exception handling activities, whether an ingestion instance may be cancelled based upon a status of the digital content distribution process.

24. The method of claim 22, wherein propagating the exception further comprises:
   executing, initiated by the one or more of the one or more recipient-defined exception handling activities, a compensation activity defined by the digital content distribution process based on detecting the exception.

25. The method of claim 24, wherein executing the compensation activity further comprises:
   reverting metadata to an original value based on determining that metadata has been updated;
   reverting a workflow status key variable to a previous state based on determining that the workflow status key variable has been updated;
   deleting the digital master from an inbound storage destination based on determining that the digital master has been transferred to the inbound storage destination; and
   deleting the digital master from the digital vault based on determining that the digital master has been transferred from the inbound storage destination to the digital vault.

26. The method of claim 1, wherein invoking the digital content distribution process further comprises:
   creating the digital copy of the stored digital master; and
   exporting the digital copy from the digital vault to an operational storage.

27. The method of claim 1, wherein servicing the digital copy further comprises:
   monitoring a message queue for a message generated by a user interface to begin servicing the content; and
   instantiating a servicing instance.

28. The method of claim 1, wherein servicing the digital copy further comprises:
   watermarking the digital copy based on the servicing request; and
   encrypting the digital copy based on the servicing request.

29. The method of claim 1, wherein:
   invoking the digital content distribution process further comprises:
      determining a workflow name, an output format, a content formatting template, and a transcode profile based on the servicing request, and
      determining whether the output format, the content formatting template, and the transcode profile are active; and
   the digital copy of the stored digital master is serviced only if the output format, the content formatting template, and the transcode profile are determined to be active.

30. A non-transitory computer readable medium encoded with a computer program comprising instructions that, when executed, operate to cause a computer to perform operations comprising:
   receiving data for modeling a digital content distribution process, the data specifying a recipient-defined grouping of processing activities, and one or more recipient-defined exception handling activities that run asynchronously from the processing activities;
   dynamically modeling a digital content distribution process based on the recipient-defined grouping of processing activities, and the one or more recipient-defined exception handling activities that run asynchronously from the processing activities;
   invoking, using one or more processors, the digital content distribution process, comprising:
      ingesting digital content, further comprising storing a digital master of the digital content in a digital vault, and
      servicing a digital copy of the stored digital master based on a servicing request; and
   providing the serviced digital copy to the recipient.

31. A system comprising:
   one or more computers; and
   a computer-readable medium coupled to the one or more computers having instructions stored thereon which, when executed by the one or more computers, cause the one or more computers to perform operations comprising:
      receiving data for modeling a digital content distribution process, the data specifying a recipient-defined grouping of processing activities, and one or more recipient-defined exception handling activities that run asynchronously from the processing activities;
      dynamically modeling a digital content distribution process based on the recipient-defined grouping of processing activities, and the one or more recipient-defined exception handling activities that run asynchronously from the processing activities;
      invoking, using one or more processors, the digital content distribution process, comprising:
         ingesting digital content, further comprising storing a digital master of the digital content in a digital vault, and
         servicing a digital copy of the stored digital master based on a servicing request; and
      providing the serviced digital copy to the recipient.

* * * * *